(12) United States Patent
Yamada et al.

(10) Patent No.: US 10,449,924 B2
(45) Date of Patent: Oct. 22, 2019

(54) AIRBAG DEVICE FOR A FRONT PASSENGER SEAT

(71) Applicant: TOYODA GOSEI CO., LTD., Kiyosu-shi, Aichi-ken (JP)

(72) Inventors: Ikuo Yamada, Kiyosu (JP); Motoyuki Tanaka, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 23 days.

(21) Appl. No.: 15/992,286

(22) Filed: May 30, 2018

(65) Prior Publication Data

US 2018/0345901 A1 Dec. 6, 2018

(30) Foreign Application Priority Data

May 31, 2017 (JP) .................................. 2017-108721

(51) Int. Cl.
*B60R 21/2338* (2011.01)
*B60R 21/205* (2011.01)
*B60R 21/00* (2006.01)

(52) U.S. Cl.
CPC ........ *B60R 21/2338* (2013.01); *B60R 21/205* (2013.01); *B60R 2021/0004* (2013.01); *B60R 2021/0009* (2013.01); *B60R 2021/0048* (2013.01); *B60R 2021/23382* (2013.01)

(58) Field of Classification Search
CPC .............. B60R 21/2338; B60R 21/205; B60R 2021/23382
See application file for complete search history.

(56) References Cited

U.S. PATENT DOCUMENTS

| 9,187,055 | B1 * | 11/2015 | Genthikatti | ......... B60R 21/2338 |
| 9,358,945 | B2 * | 6/2016 | Yamada | ................ B60R 21/233 |
| 9,505,372 | B2 * | 11/2016 | Yamada | ............. B60R 21/2338 |
| 9,738,243 | B2 * | 8/2017 | Fukawatase | ........ B60R 21/2338 |
| 9,758,123 | B2 | 9/2017 | Yamada et al. | |
| 9,796,354 | B1 * | 10/2017 | Hayashi | ................ B60R 21/239 |
| 2007/0205591 | A1 | 9/2007 | Bito | |
| 2016/0046254 | A1 * | 2/2016 | Yamada | ................ B60R 21/233 280/729 |

(Continued)

FOREIGN PATENT DOCUMENTS

JP   2008-44594 A   2/2008

*Primary Examiner* — Faye M Fleming
(74) *Attorney, Agent, or Firm* — Posz Law Group, PLC

(57) ABSTRACT

An airbag includes, in a rear portion thereof, a passenger protection region for protecting a passenger. The passenger protection region includes a front-collision arresting plane, an oblique-collision arresting plane that is disposed on a left side and/or right side of the front-collision arresting plane, and an arresting recess that is disposed between the front-collision arresting plane and the oblique-collision arresting plane. Further, the airbag internally includes a tether that joints a front end portion of the airbag and the bottom of the arresting recess, and an auxiliary tether that joints the front end portion of the airbag and a side edge region of the front-collision arresting plane apart from the arresting recess. The tether and the auxiliary tether are designed to be deployed generally symmetrically with respect to a line that runs in a front and rear direction through a mounting center of the airbag to a case of the airbag.

5 Claims, 17 Drawing Sheets

(56) References Cited

U.S. PATENT DOCUMENTS

2018/0022303 A1* 1/2018 Yamada ................ B60R 21/205
                                                                     280/732
2018/0154856 A1* 6/2018 Yamada ................ B60R 21/231
2019/0092268 A1* 3/2019 Ishida ................... B60R 21/237

* cited by examiner

AIRBAG DEVICE FOR A FRONT PASSENGER SEAT

CROSS REFERENCE TO RELATED APPLICATIONS

The Present application claims priority from Japanese Patent Application No. 2017-108721 of Yamada et al., filed on May 31, 2017, the entire disclosure of which is incorporated herein by reference.

BACKGROUND OF THE INVENTION

1. Field of the Invention

The present invention relates to an airbag device for a front passenger seat adapted to be stored in an instrument panel of a vehicle in front of the front passenger seat. More particularly, the invention relates to an airbag device for a front passenger seat including an airbag which is housed in a housing in a folded-up configuration and deployable rearward for protecting a passenger when fed with an inflation gas.

2. Description of Related Art

JP 2016-132385 A discloses a known airbag device for a front passenger seat whose airbag includes, in the rear portion as deployed, a front-collision arresting plane for protecting the head of a passenger in the event of a frontal collision of the vehicle, an oblique-collision arresting plane for protecting the head of the passenger in the event of an oblique collision or an offset collision of the vehicle, and an arresting recess which is recessed forward between the front-collision arresting plane and the oblique-collision arresting plane for receiving and arresting the head of the passenger. Additionally, the airbag internally includes a tether which is connected to the leading end of the arresting recess for preventing the arresting recess from moving rearward at airbag deployment.

The tether of the above airbag extends towards the left and right from the leading end of the arresting recess, at a slant with respect to a left and right direction such that the left end is located at a farther rearward position than the right end. The airbag as inflated has such an asymmetric contour that the left side where the arresting recess is disposed is greater than the right side. More particularly, the left side of the airbag having the arresting recess also protrudes rearward so as to extend the oblique-collision arresting plane rearward from the front-collision arresting plane. Although the tether described above is capable of preventing the arresting recess from moving rearward at airbag deployment, it is not competent enough to inflate the airbag in a balanced fashion in a left and right direction.

SUMMARY OF THE INVENTION

An object of the present invention is to provide an airbag device for a front passenger seat which is capable of inflating an airbag in a balanced fashion between the left and right portions, and deploying the airbag quickly.

The object of the invention will be achieved by a following airbag device for a front passenger seat:

The airbag device for a front passenger seat of the invention is adapted to be mounted on an instrument panel in front of a front passenger seat of a vehicle. The airbag device includes a housing that is adapted to be mounted on the instrument panel, and an inflatable airbag that is housed in the housing in a folded-up configuration. The airbag is mounted on the housing by the front end portion, and a rear portion of the airbag as deployed serves as a passenger protection region. The passenger protection region includes:

- a front-collision arresting plane for protecting a head of a passenger as he moves forward in the event of a frontal collision of the vehicle;
- an oblique-collision arresting plane that is disposed on a left side and/or right side of the front-collision arresting plane for protecting the head of the passenger as he moves diagonally forward in the event of an oblique collision or an offset collision of the vehicle; and
- an arresting recess that is recessed forward between the front-collision arresting plane and the oblique-collision arresting plane for catching and arresting the head of the passenger therein.

Furthermore, the airbag internally includes a tether that joints the front end portion of the airbag and a bottom of the arresting recess and is deployable at a slant with respect to a front and rear direction, and an auxiliary tether that joints the front end portion of the airbag and a side edge region of the front-collision arresting plane apart from the arresting recess. The tether and the auxiliary tether are configured to be deployed generally symmetrically with respect to a line that runs in the front and rear direction through a mounting center of the airbag to the housing.

In the airbag device of the invention, the airbag includes the oblique-collision arresting plane that is disposed at least on the left or right side of the front-collision arresting plane for protecting the head of the diagonally-moving passenger. In other words, the airbag is designed to be inflated asymmetrically such that the portion with the oblique-collision arresting plane protrudes only on one side of the front-collision arresting plane. However, the airbag of the invention includes the auxiliary tether that joints the front end portion of the airbag and the side edge region of the front-collision arresting plane apart from the arresting recess, in addition to the recess-pulling tether that joints the front end portion of the airbag and the bottom of the arresting recess disposed between the front-collision arresting plane and oblique-collision arresting plane. The tether and the auxiliary tether are designed to be deployed generally symmetrically with respect to the line that runs in the front and rear direction through the mounting center of the airbag to the housing. That is, a left edge region and a right edge region of the front-collision arresting plane are both joined to the front end portion of the airbag with the tether, through the medium of the arresting recess, and auxiliary tether. This configuration helps prevent the left edge region and right edge region of the front-collision arresting plane from protruding rearward unduly at airbag deployment, thus deploying the airbag in a balanced fashion in a left and right direction. Moreover, if the passenger's head moves forward and bumps a central region in a left and right direction of the front-collision arresting plane in the event of a frontal collision, the central region of the front-collision arresting plane will be sunken forward such that the left edge region and right edge region are disposed rearward relatively. In such an instance, in the airbag device of the invention, since the tether and the auxiliary tether joint both of the left and right edge region of the front-collision arresting plane to the front end portion of the airbag, a generally identical tensile force will be applied to the tether (including the arresting recess) and auxiliary tether, such that a region of the front-collision arresting plane disposed between the tether and auxiliary tether will cushion the passenger's head smoothly in a balanced fashion.

Therefore, the airbag device for a front passenger seat of the invention is capable of inflating the airbag with a balance between the left and right portions and deploying the airbag quickly. Thus the airbag is capable of catching the head of the passenger in a balanced fashion in the event of a frontal collision of the vehicle.

Moreover, the tether of the airbag of the invention is capable of keeping the arresting recess recessed at and after airbag deployment, and preventing the arresting recess from oscillating in the front and rear direction during airbag deployment. That is, the tether will help deploy the arresting recess at a predetermined position quickly such that the arresting recess can receive the passenger's head adequately.

In the airbag device of the invention, it is desired that the oblique-collision arresting plane is designed to protrude rearward from the front-collision arresting plane at airbag deployment. The oblique-collision arresting plane configured like this will be capable of catching the head of a diagonally-moving passenger and guiding the head into the arresting recess such that the arresting recess arrests the head further adequately in the event of an oblique collision or an offset collision of the vehicle.

It is further desired that the airbag includes, inside of the airbag, a front-rear tether that joints the front end portion of the airbag and a generally central portion in the left and right direction of the front-collision arresting plane for preventing the front-collision arresting plane from moving rearward at airbag deployment, and is deployable generally along the front and rear direction. Such a front-rear tether will be capable of preventing the front-collision arresting plane from moving rearward unduly in an initial stage of airbag deployment, and preventing a rearward movement of the front-collision arresting plane as has fully deployed as well.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
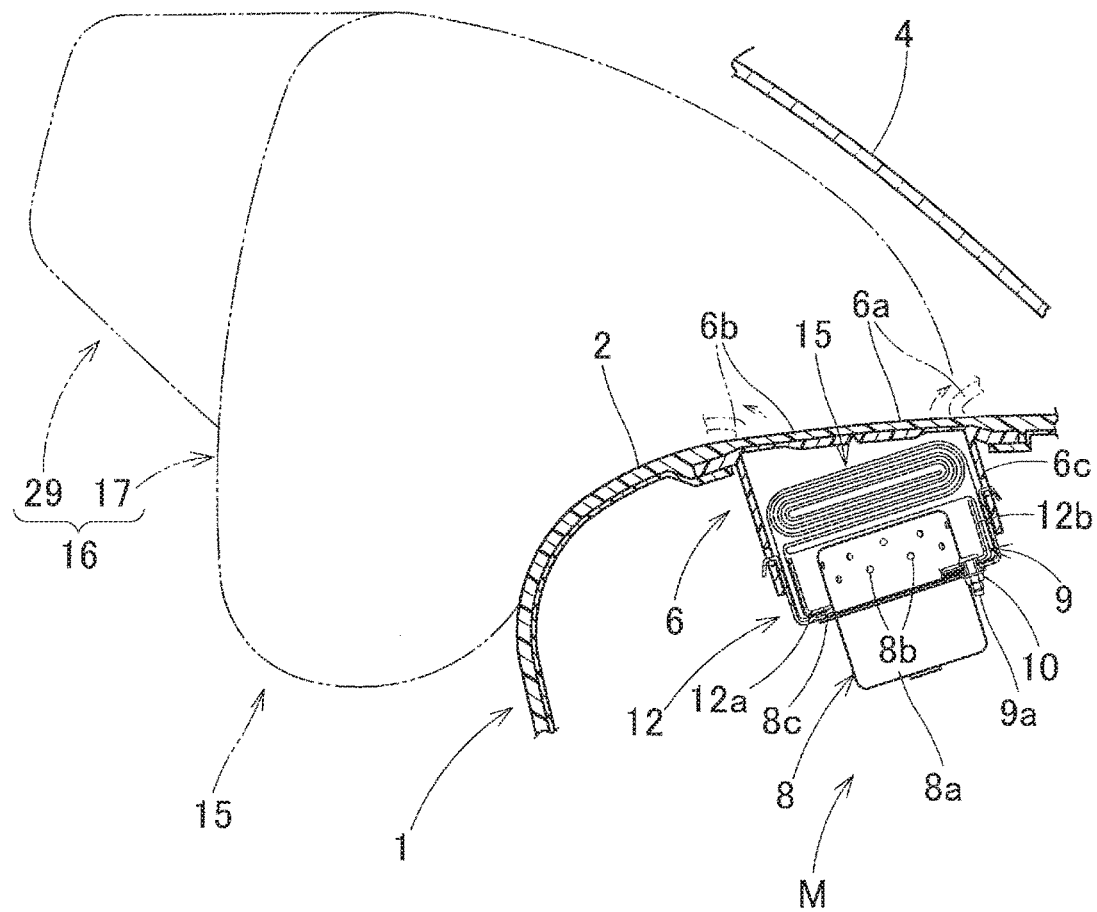
FIG. 1 is a schematic vertical section of an airbag device for a front passenger seat embodying the invention as mounted on a vehicle.
Figure 2:
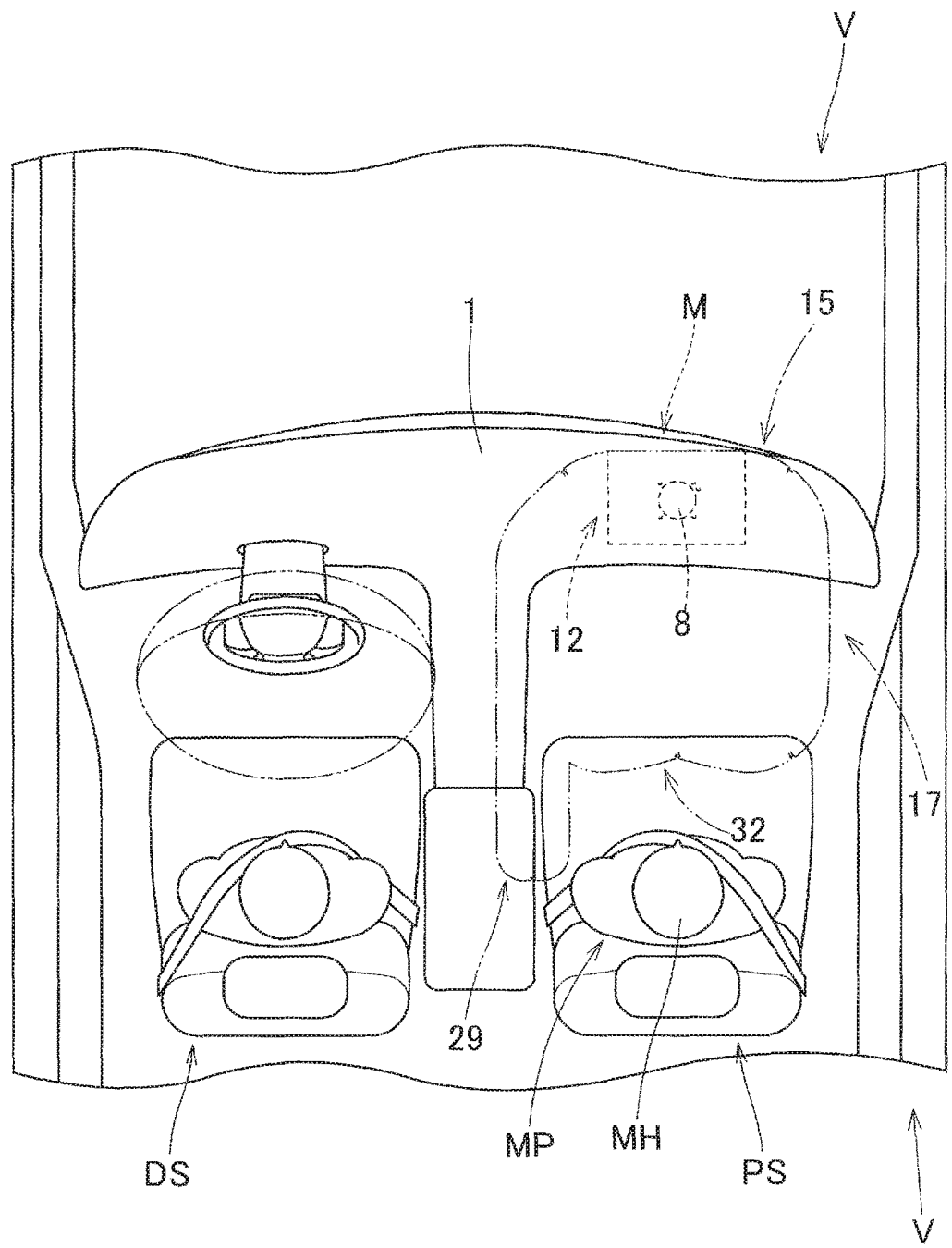
FIG. 2 is a schematic plan view of the airbag device of FIG. 1 as mounted on the vehicle.

FIGS. 1 and 2 depict an airbag device M for a front passenger seat embodying the invention as mounted on a vehicle V. The airbag device M is a top-mount airbag device stored inside a top plane 2 of an instrument panel or dashboard 1 in front of a front passenger seat PS of the vehicle V. Unless otherwise specified, front-rear, up-down and left-right directions in this specification are intended to refer to front-rear, up-down and left-right directions of the vehicle V.

As shown in FIG. 1, the airbag device M includes an airbag 15, which is folded up, an inflator 8 for supplying the airbag 15 with an inflation gas, a case or housing 12 for storing and holding the airbag 15 and inflator 8, a retainer 9 for mounting the airbag 15 and inflator 8 on the case 12 and an airbag cover 6 for covering the airbag 15 from above.

The airbag cover 6 is integral with the dashboard 1 made from synthetic resin and includes two doors, i.e. front and rear doors 6a and 6b, which are designed to open when pushed by the airbag 15 upon airbag deployment. The airbag cover 6 further includes, around the doors 6a and 6b, a joint wall 6c which is coupled to the case 12.

As shown in FIG. 1, the inflator 8 includes a main body 8a which is formed into a generally pot-like shape and provided with a plurality of gas discharge ports 8b, and a flange 8c for attachment to the case 12. The inflator 8 of the illustrated embodiment is designed to be actuated in the event of a frontal collision, an oblique collision or an offset collision of the vehicle V.

As shown in FIG. 1, the case 12 is made of sheet metal into a generally rectangular parallelepiped with a rectangular opening at the top, and includes a generally rectangular bottom wall 12a which the inflator 8 is inserted into and mounted on from below, and a circumferential wall 12b which extends upward from the outer edge of the bottom wall 12a and is engaged with the joint wall 6c of the airbag cover 6. The airbag 15 and inflator 8 are attached to the bottom wall 12a of the case 12 through the use of bolts 9a of the retainer 9 serving as mounting means. More specifically, the retainer 9 is located inside the airbag 15 such that the bolts 9a go through a periphery of a later-described gas inlet port 21 of the airbag 15, the bottom wall 12a of the case 12 and the flange 8c of the inflator 8, and the bolts 9a are fastened with nuts 10. Thus the airbag 15 and inflator 8 are attached to the bottom wall 12a of the case 12. As shown in FIG. 2, the case 12 is formed into a rectangle whose width in a left and right direction is greater than the width in a front and rear direction, and the inflator 8 is mounted generally at the center in the left and right direction of the bottom wall 12a. Further, unillustrated brackets are provided on the bottom wall 12a of the case 12 for mounting on the vehicle body structure.

Referring to FIGS. 3 to 6, the airbag 15 includes a bag body 16 which is inflatable with an inflation gas, and tethers 41, 47, 53, 82 and 84 which are disposed inside the bag body 16 for controlling the contour of the bag body 16 as fully inflated.

The bag body 16 is fabricated of a sheet material having flexibility. As shown in FIGS. 3 to 6, the bag body 16 of the illustrated embodiment includes a principal inflatable section 17 and a protruding inflatable section 29 which is deployable in such a manner as to protrude rearward out of a rear portion of the principal inflatable section 17.

Figure 3:
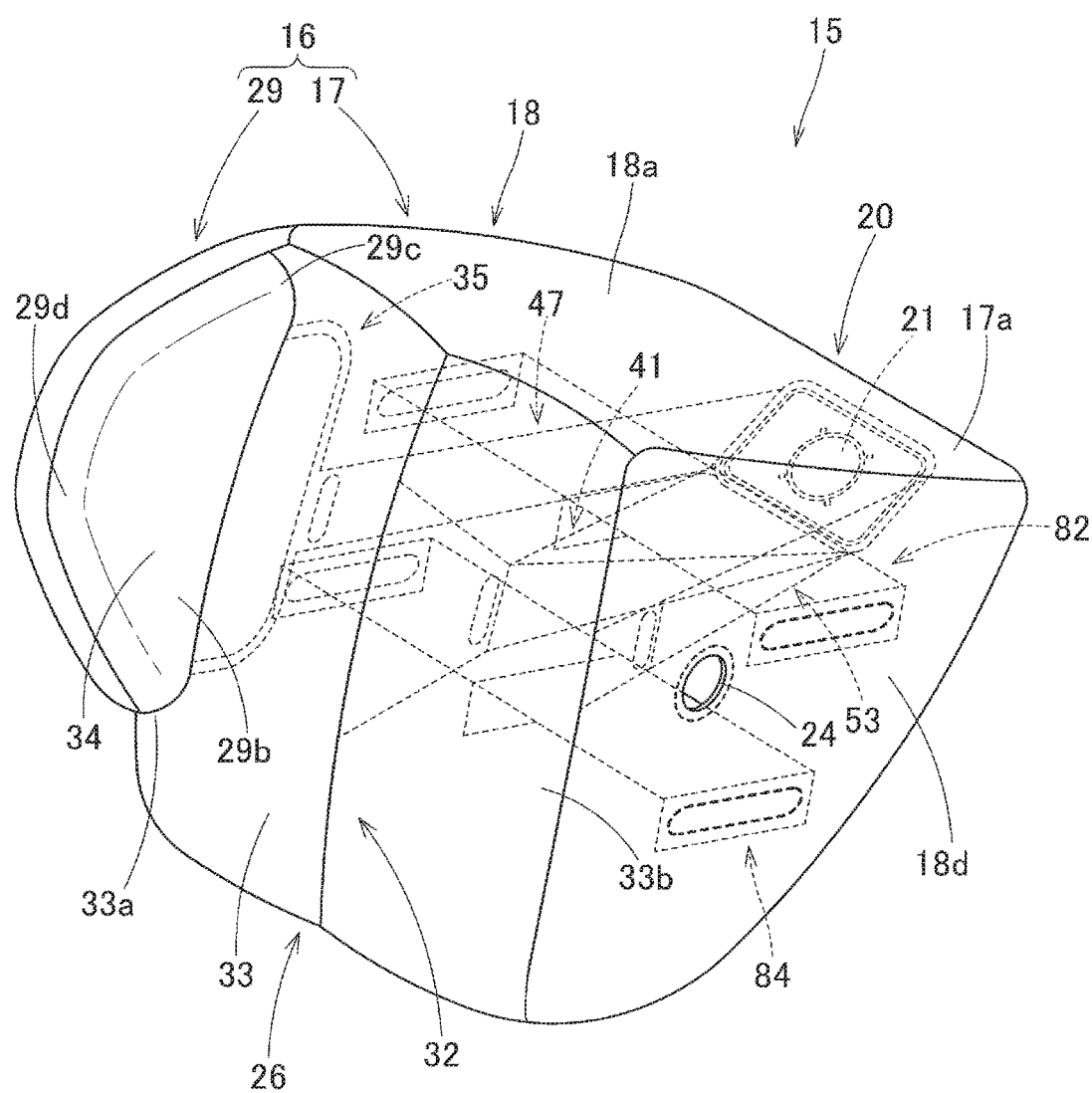
FIG. 3 is a perspective view of an airbag for use in the airbag device of FIG. 1 as inflated by itself, viewed from right rear upper direction.
Figure 4:
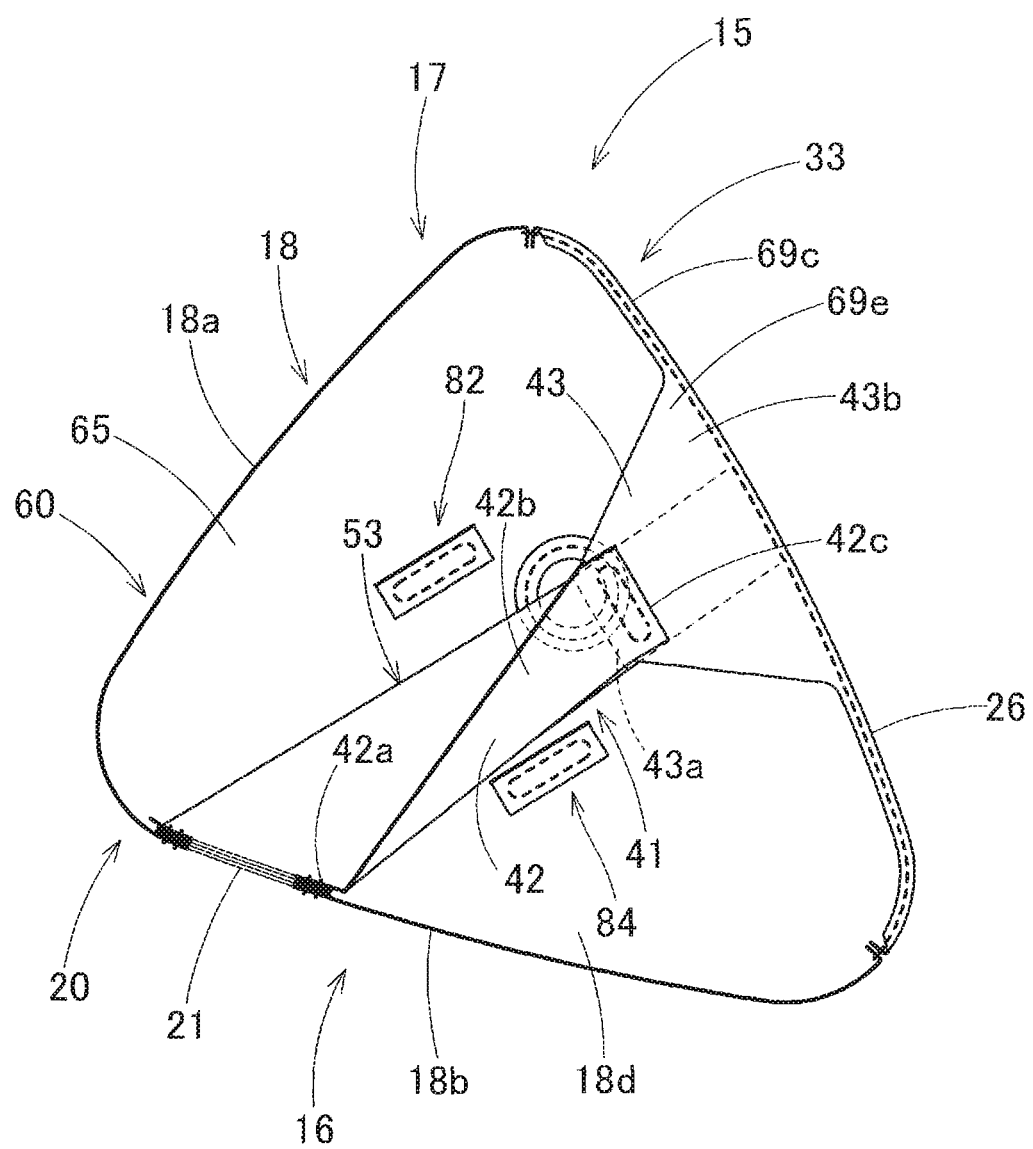
FIG. 4 is a schematic vertical section of the airbag of FIG. 3 taken at the location of a front-rear tether.
Figure 5:
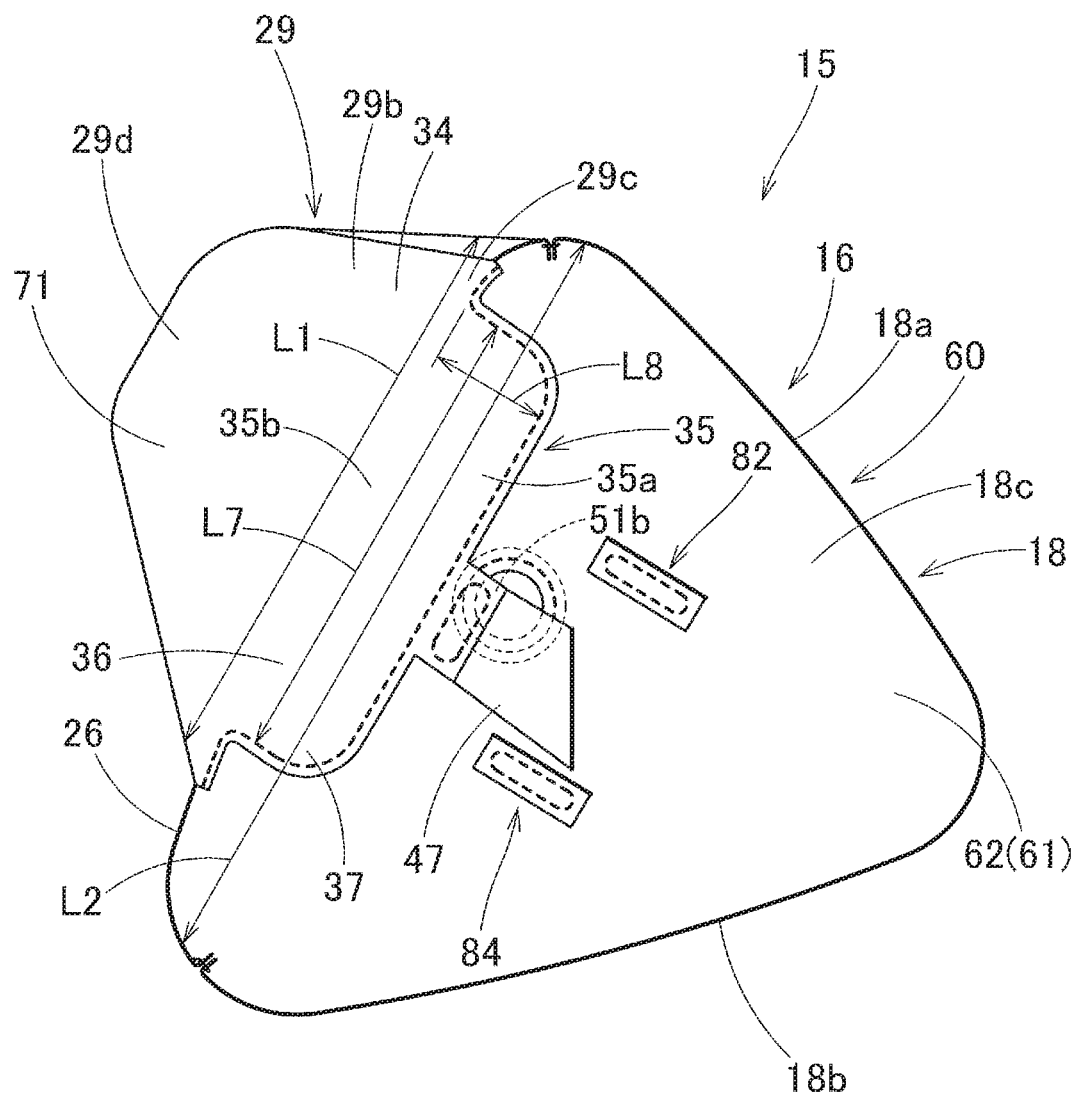
FIG. 5 is a schematic vertical section of the airbag of FIG. 3 taken at the location of an arresting recess.
Figure 6:
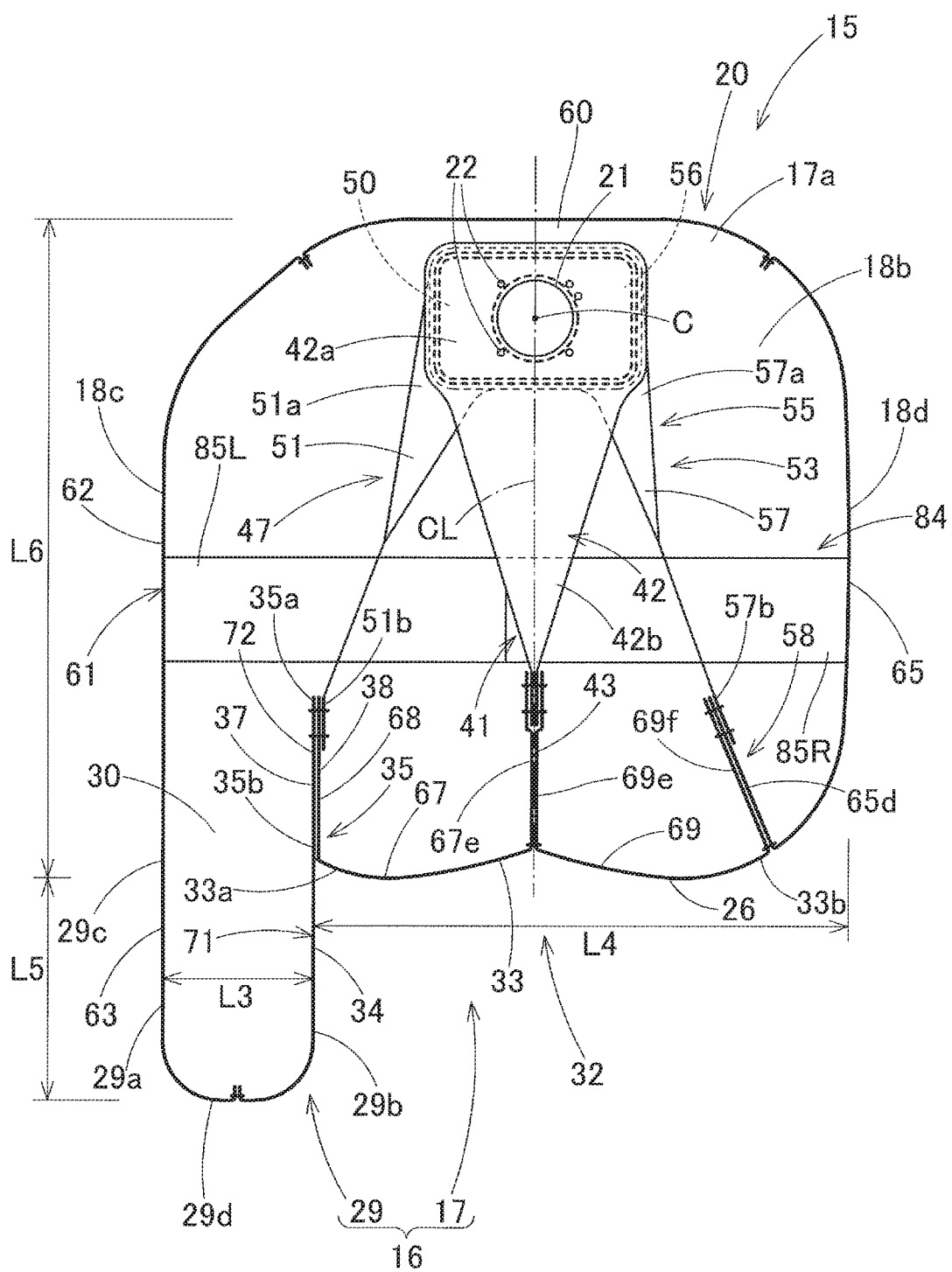
FIG. 6 is a schematic horizontal sectional view of the airbag of FIG. 3.
Figure 9:
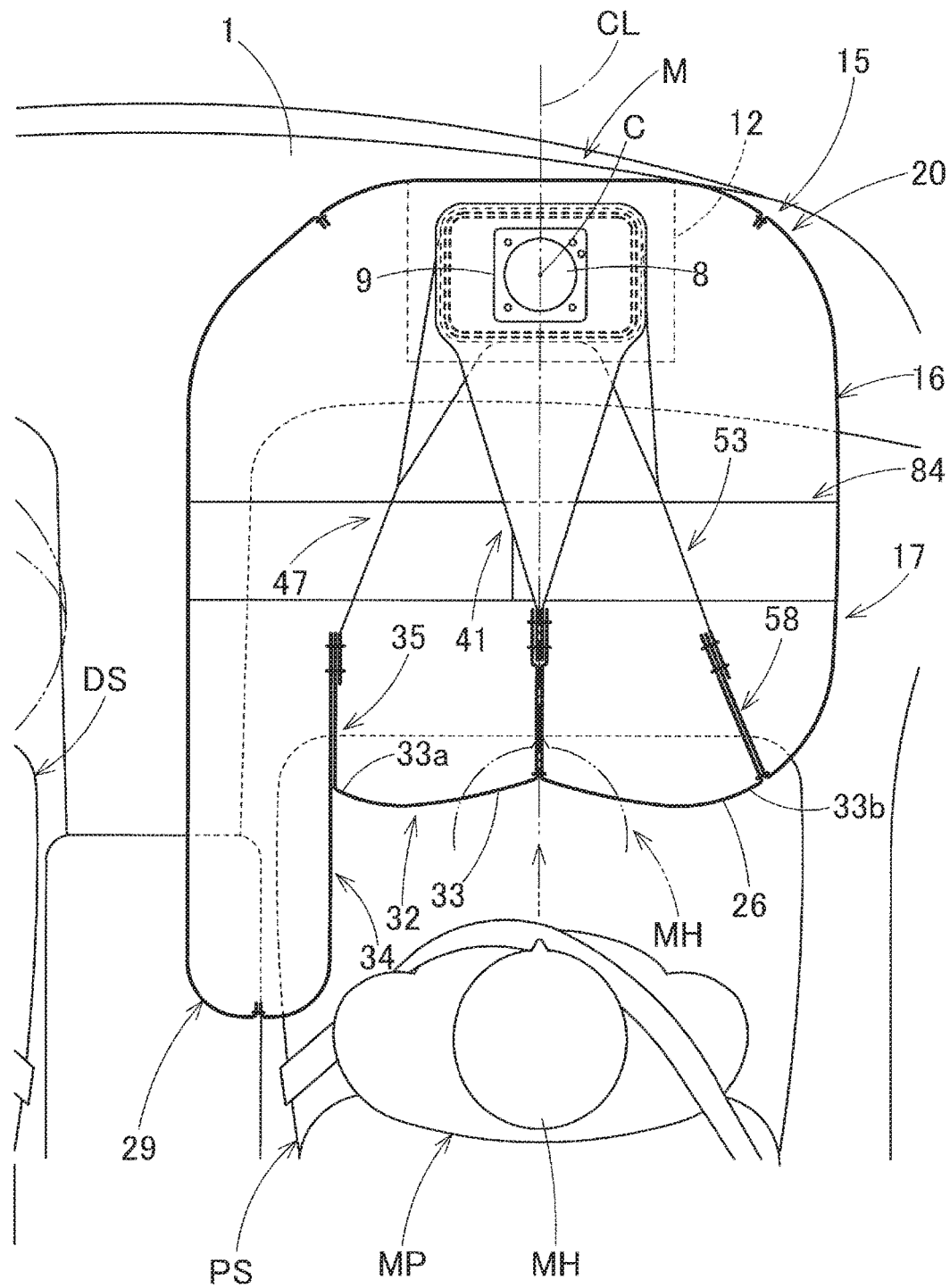
FIG. 9 is a schematic horizontal sectional view of the airbag device as has completed airbag deployment.

The principal inflatable section 17 is designed to be so deployed as to fill up a space between the top plane 2 of the dashboard 1 and the windshield 4, as indicated with double-dotted lines in FIG. 1. More specifically, as shown in FIGS. 3 to 5, the outer contour of the principal inflatable section 17 as fully inflated is a generally triangular prism elongated in a left and right direction. As shown in FIGS. 3 and 6, the principal inflatable section 17 includes a mounting region 20 at the front end 17a portion as deployed, at which mounting region 20 the principal inflatable section 17 is mounted on the case 12. That is, with the front end 17a portion fixed to the case 12, the principal inflatable section 17 is designed to protrude rearward and slightly towards the left (i.e. towards the driver's seat DS) at airbag deployment, as shown in FIG. 9. The principal inflatable section 17 includes a rear side wall 26 which is deployable at the rear to face a passenger MP and a circumferential wall 18 which extends forward from the circumferential edge of the rear side wall 26 while tapering forward in an up and down direction.

The circumferential wall 18 is designed deployable mainly in such a manner as to fill up the space between the top plane 2 of the dashboard 1 and the windshield 4, and includes an upper wall 18a and a lower wall 18b which are opposed to each other in an up and down direction, and a left side wall 18c and a right side wall 18d which are opposed to each other in a left and right direction. In the airbag 15 of the illustrated embodiment, the front end region of the circumferential wall 18 as deployed serves as the mounting region 20 at which the airbag 15 is mounted on the case 12. In the illustrated embodiment, the mounting region 20 as fully inflated is greater in width in a left and right direction than the case 12, such that the mounting region 20 protrudes from the case 12 outwardly in the left and right direction, as shown in FIG. 9. The mounting region 20 is provided, at its lower portion (i.e. on the lower wall 18b), with a round gas inlet port 21 for receiving the inflator 8 for introducing an inflation gas, and a plurality of (four, in the illustrated embodiment) mounting holes 22 for receiving the bolts 9a of the retainer 9 which secure the periphery of the gas inlet port 21 to the bottom wall 12a of the case 12. The gas inlet port 21 is disposed generally at the center in a left and right direction of the mounting region 20. As shown in FIGS. 6 and 9, in the illustrated embodiment, the airbag 15 is secured to the case 12 and mounted on the vehicle V such that a mounting center C, the center of the gas inlet port 21, falls on the center in a left and right direction of the passenger seat PS. A line which runs through the mounting center C in a front and rear direction will be called hereinafter a center line CL. Each of the left side wall 18c and right side wall 18d of the circumferential wall 18 is provided with a vent hole 24 for releasing an extra inflation gas. In the illustrated embodiment, the width in the left and right direction of the principal inflatable section 17 is generally uniform in the front portion (mounting region 20) and rear portion, such that the left side wall 18c and right side wall 18d extend generally along a front and rear direction at airbag deployment, as shown in FIGS. 6 and 9.

The rear side wall 26 is deployable generally vertically at the rear to face the front passenger seat PS. The rear side wall 26 of the illustrated embodiment is deployable slightly at a slant relative to an up and down direction such that the lower end is located farther rearward than the upper end as shown in FIGS. 1 (double-dotted lines) and 4. In a horizontal sectional view of the airbag 15 as deployed, the rear side wall 26 extends generally along the left and right direction except the left upper corner portion, as shown in FIG. 6. The protruding inflatable section 29 is located in an area to the left side with respect to the center in the left and right direction of the rear side wall 26 (i.e. on the left side of the center line CL, or at the leftmost region) in such a manner as to protrude rearward from the rear side wall 26. More specifically, the protruding inflatable section 29 is formed at a left upper end portion of the rear side wall 26 as deployed, thus deployable at an obliquely left front position of the head MH of the passenger MP sitting in the front passenger seat PS, as shown in FIG. 9.

The protruding inflatable section 29 communicates with the principal inflatable section 17 via a communication region 30 located at the front end 29c as deployed, thus fed with an inflation gas from the principal inflatable section 17 via the communication region 30 (FIG. 6). The protruding inflatable section 29 is inflatable into a generally board whose thickness is defined in a left and right direction. As viewed from the left or right, the protruding inflatable section 29 as inflated has a generally trapezoidal contour, as shown in FIGS. 3, 5 and 6. More specifically, the outer contour of the protruding inflatable section 29 as fully inflated is such a trapezoid that narrows towards the rear end 29d from the front end 29c (i.e. from the principal inflatable section 17), as shown in FIG. 5. The protruding inflatable section 29 includes a left side wall 29a and a right side wall 29b which are opposed to each other in the left and right direction as deployed. The left side wall 29a is continuous with the left side wall 18c of the circumferential wall 18 of the principal inflatable section 17, as shown in FIG. 6. As shown in FIG. 6, in a horizontal sectional view of the airbag 15 as deployed, the protruding inflatable section 29 is formed at an area of the airbag 15 to the left side with respect to the center line CL which runs through the mounting center C in the front and rear direction (in other words, at an area disposed towards the driver's seat DS with respect to the center line CL). More specifically, the protruding inflatable section 29 is designed to be deployed at a farther leftward position than the case 12 in a horizontal sectional view, as shown in FIG. 9. As shown in FIG. 5, the width L1 in an up and down direction of the front end 29c of the protruding inflatable section 29 as fully inflated is approximately two thirds of the width L2 in the up and down direction of the rear side wall 26 of the principal inflatable section 17. As shown in FIG. 6, the width L3 in the left and right direction of the protruding inflatable section 29 as fully inflated is approximately three tenths of the width L4 in the left and right direction of the rear portion of the principal inflatable section 17. Further, the protruding amount (i.e. the width L5 in a front and rear direction) of the protruding inflatable section 29 from the rear side wall 26 is approximately one fourth of the width L6 in the front and rear direction of the principal inflatable section 17 as fully inflated, as shown in FIG. 6. The dimensions of the protruding inflatable section 29 is determined such that the right side wall 29b (i.e. a later-described oblique-collision arresting plane 34) of the protruding inflatable section 29 is capable of cushioning the head MH of the passenger MP adequately and guiding the head MH into a later-described arresting recess 35 smoothly when the head MH moves diagonally forward to the left and bumps the right side wall 29b.

In the airbag 15 of the illustrated embodiment, the protruding inflatable section 29 and the rear side wall 26 of the principal inflatable section 17 constitute a passenger protection region 32 which protects the passenger MP at airbag deployment. The passenger protection region 32 includes a front-collision arresting plane 33 which protects the head MH of the passenger MP when he moves forward in the event of a frontal collision of the vehicle V, and an oblique-collision arresting plane 34 which protects the passenger's head MH when he moves diagonally forward in the event of an oblique collision or an offset collision of the vehicle V. Further, there is formed an arresting recess 35 between the front-collision arresting plane 33 and the oblique-collision arresting plane 34 for receiving and arresting the passenger's head MH.

In the illustrated embodiment, the front-collision arresting plane 33 is composed of an upper area of the rear side wall 26. In other words, the front-collision arresting plane 33 is composed of an area disposed on the right side of the protruding inflatable section 29 as deployed. That is, the front-collision arresting plane 33 includes an area extending to the left from the center line CL (i.e. towards the driver's seat DS) and an area extending to the right from the center line CL (i.e. towards a direction drawing away from the driver's seat DS) so as to protect the head MH of the passenger MP smoothly when he moves forward in the event of a frontal collision. As shown in FIG. 6, in the horizontal sectional view of the airbag 15 as deployed, the front-collision arresting plane 33 is slightly sunken forward on the center line CL or in a vicinity of the center in the left and right direction.

The oblique-collision arresting plane 34 is composed of the right side wall 29b of the protruding inflatable section 29. The oblique-collision arresting plane 34 protrudes rearward out of the front-collision arresting plane 33, and is provided only on the left side of the front-collision arresting plane 33. The oblique-collision arresting plane 34 of the illustrated embodiment is designed to extend generally along a front and rear direction at airbag deployment. The lower region of the rear side wall 26 of the airbag 15 is to catch mainly a thorax of the passenger MP when the passenger protection region 32 arrests the head MH of the passenger MP in the event of a frontal collision, oblique collision or offset collision.

The arresting recess 35 formed between the front-collision arresting plane 33 and oblique-collision arresting plane 34 is provided for catching and arresting the head MH of the passenger MP therein. In the illustrated embodiment, the arresting recess 35 is formed generally along an up and down direction at the boundary of a right portion of the protruding inflatable section 29 and the rear side wall 26 of the principal inflatable section 17, in such a manner as to be sunken or recessed forward like a pocket such that the rear end is open, as shown in FIGS. 5 and 6. That is, the arresting recess 35 is disposed in a vicinity of the left edge 33a of the front-collision arresting plane 33. More specifically, the arresting recess 35 is composed of a left side wall 37 and a right side wall 38 each of which has a generally rectangular contour elongated in an up and down direction when viewed from the left and right direction. The arresting recess 35 is formed by joining (sewing) together upper edges, lower edges and front edges of the left side wall 37 and right side wall 38, thus having a pocket-like shape opening at the rear end, as shown in FIG. 5. That is, the arresting recess 35 has a generally uniform width in an up and down direction from the rear end to the front end (bottom of the recess) 35a. The width in the up and down direction of the arresting recess 35, i.e. the width of an opening 36, is such as to admit the passenger's head MH smoothly. More specifically, the width L7 (FIG. 5) in the up and down direction of the arresting recess 35 (i.e. the width of the opening 36) is approximately 400 mm, which is smaller than the width L1 in the up and down direction of the front end 29c portion of the protruding inflatable section 29. The dimension L8 (FIG. 5) in the front and rear direction (i.e. depth) of the arresting recess 35 is approximately 50 to 100 mm, which is enough to accommodate a front region of the passenger's head MH. The center in the up and down direction of the arresting recess 35 generally coincides with the center in an up and down direction of the protruding inflatable section 29.

In the illustrated embodiment, the airbag 15 is internally provided with a recess-pulling tether 47 which is jointed to the bottom (i.e. the front end 35a) of the arresting recess 35. The recess-pulling tether 47 pulls the bottom (i.e. the front end 35a) of the arresting recess 35 forward at airbag deployment, as shown in FIGS. 5 and 6. More specifically, pulled by the recess-pulling tether 47, the arresting recess 35 of the illustrated embodiment is deployed in such a manner as to be continuous with the right side wall 29b of the protruding inflatable section 29 and extend generally along a front and rear direction, and such that the left side wall 37 and right side wall 38 are brought into contact with each other generally wholly and thus the rear end 35b (or the opening 36) is held from gaping open, as shown in FIG. 6.

As shown in FIGS. 4 to 6, the bag body 16 internally includes tethers 41, 47, 53, 82 and 84. Specifically, the bag body 16 includes, inside the principal inflatable section 17, a front-rear tether 41, two left-right tethers 82 and 84, the recess-pulling tether 47, and an auxiliary tether 53.

The front-rear tether 41 connects a generally central portion in the left and right direction of the front-collision arresting plane 33 and the front end 17a portion of the airbag 15 (i.e. the principal inflatable section 17). As shown in FIG. 6, the front-rear tether 41 is designed to be deployed on the center line CL, and is formed by jointing a front section 42 extending from the periphery of the gas inlet port 21 and a rear section 43 extending from the rear side wall 26, as shown in FIG. 4.

Figure 7:
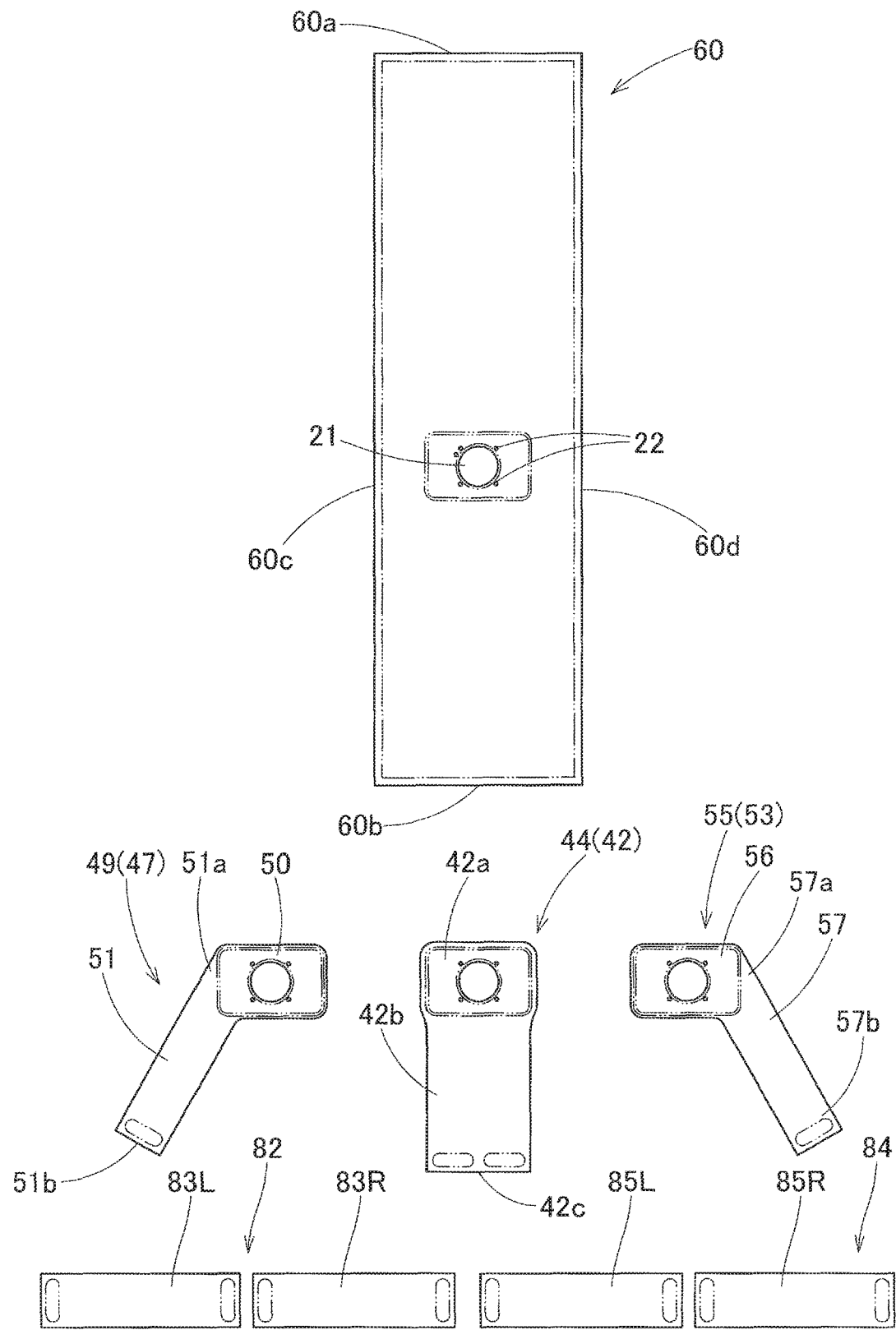
FIGS. 7 and 8 depict base members of the airbag of FIG. 3 by plan views.

The front section 42 is formed by double-folding a base member 44 shown in FIG. 9 into a bilaterally symmetric shape deployable in such a three dimensional shape approximate to a generally triangular pyramid that the front end portion extends generally in a left and right direction and the rear end portion extends generally in an up and down direction. The base member 44 is formed into a band extending in a front and rear direction. In the illustrated embodiment, as shown in FIGS. 4, 6 and 7, the front section 42 has a joint region 42a at the front end, and the joint region 42a is jointed to a lower portion of the mounting region 20 of the principal inflatable section 17, at the circumference of the gas inlet port 21. The joint region 42a is provided with openings (reference numerals omitted) corresponding to the gas inlet port 21 and mounting holes 22. The rear end portion extending rearward from the gas inlet port 21 constitutes a main region 42b of the front section 42, and the main region 42b is deployable in the three dimensional shape approximate to a generally triangular pyramid, as shown in FIG. 4. The main region 42b is sewn to a front end 43a of the rear section 43 by the rear end 42c, and a width in an up and down direction of the rear end 42c is generally identical to that of the front end 43a of the rear section 43.

Figure 8:
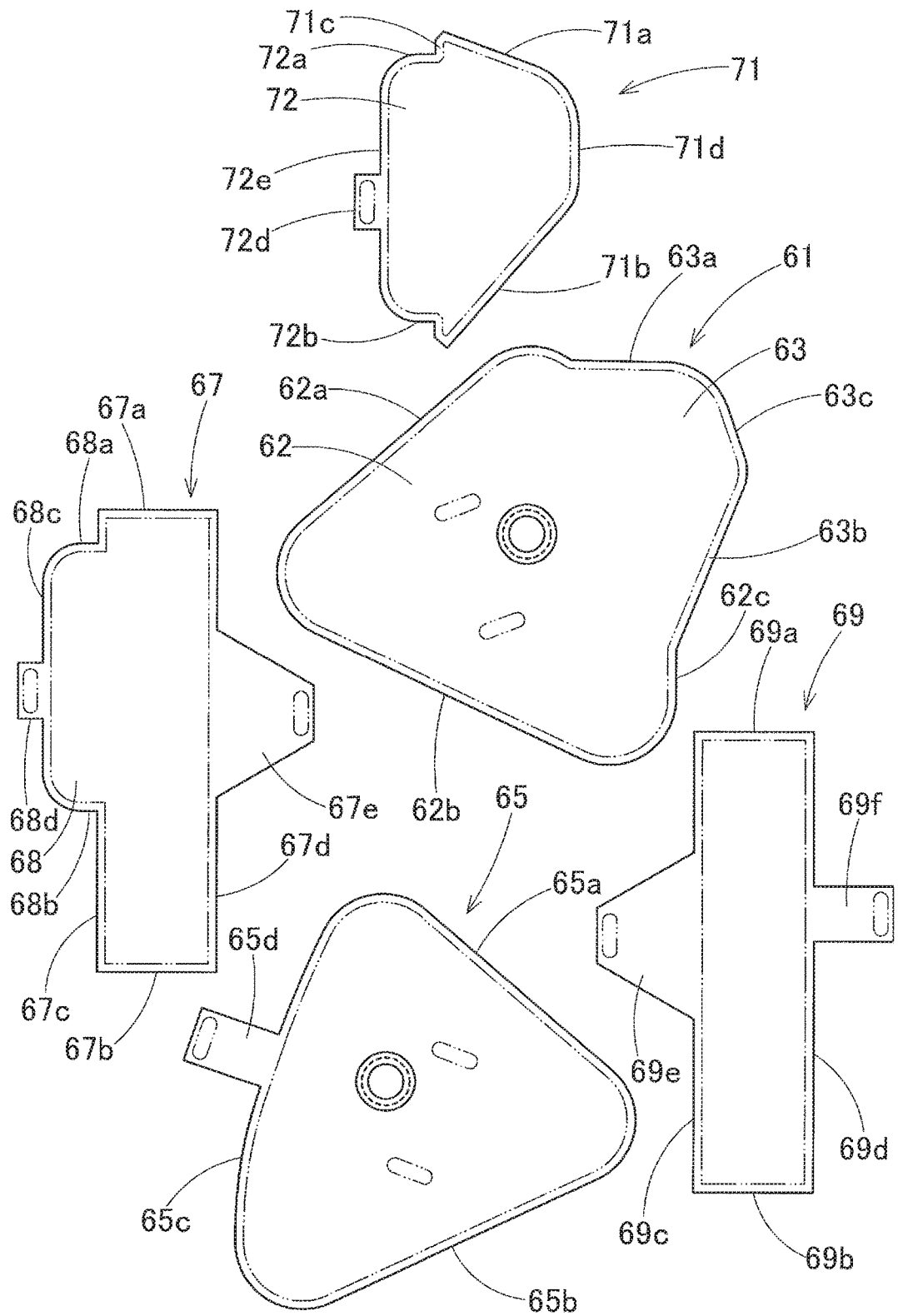

In the illustrated embodiment, the rear section 43 is composed of an extended region 67e and an extended region 69e of a later-described rear left panel 67 and a later-described rear right panel 69. The rear left panel 67 and rear right panel 69 form the rear side wall 26 of the principal inflatable section 17, and each of the extended regions 67e and 69e extends from the right edge 67d of the rear left panel 67/left edge 69c of the rear right panel 69, and is integral with the rear left panel 67/rear right panel 69, as shown in FIGS. 6 and 8. In other words, the rear section 43 has a double-wall structure of the extended regions 67e and 69e. The rear section 43 is jointed to the front section 42 by the front end 43a. More specifically, the rear section 43 has a generally trapezoidal shape which enlarges towards the rear end 43b in an up and down direction from the front end 43a. The rear section 43 of the illustrated embodiment is jointed to a generally central portion in the up and down direction of the rear side wall 26.

The front-rear tether 41 is provided for limiting a clearance between the periphery of the gas inlet port 21 and a center of protection of the rear side wall 26 for protecting the passenger MP in the event of a frontal collision (i.e. a portion of the rear side wall 26 intersecting with the center line CL). In other words, the front-rear tether 41 joints the generally central portion in the left and right direction of the front-collision arresting plane 33 and the front end 17a portion of the airbag 15 (or principal inflatable section 17). The front-rear tether 41 prevents the front-collision arresting plane 33 from protruding unduly rearward in an initial stage of airbag deployment and also prevents the front-collision arresting plane 33 as fully deployed from moving rearward. In the illustrated embodiment, pulled by the front-rear tether 41, the portion of the rear wide wall 26 on the center line CL is slightly sunken forward over a generally entire area in an up and down direction at airbag deployment, as shown in FIG. 6.

Each of the left-right tethers 82 and 84 is disposed generally along a left and right direction and connects the left wall region 18c and right wall region 18d of the principal inflatable section 17 inside the bag body 16 as inflated. In the illustrated embodiment, as shown in FIGS. 3 to 5, the left-right tethers 82 and 84 are disposed at two positions above and below the front-rear tether 41. As shown in FIGS. 4 and 5, each of the upper left-right tether 82, which is located above the front-rear tether 45, and the lower left-right tether 84, which is located below the front-rear tether 45, is formed into a band, and is deployable in such a manner that the length direction extends generally along a horizontal direction. In the illustrated embodiment, each of the left-right tethers 82 and 84 is formed by jointing a pair of base members 83L and 83R/85L and 85R in a serial fashion in a left and right direction, as shown in FIG. 7. The left-right tethers 82 and 84 are provided for limiting a clearance between left wall region 18c and right wall region 18d of the principal inflatable section 17.

The recess-pulling tether 47 joints the bottom of the arresting recess 35 and the front end 17a portion of the airbag 15 (principal inflatable section 17) inside the principal inflatable section 17, as shown in FIG. 6. The recess-pulling tether 47 of the illustrated embodiment is composed of a base member 49 shown in FIG. 7. The base member 49 includes a band-shaped main body 51 and a joint region 50 which protrudes towards the right from the front end 51a of the main body 51. The joint region 50 is joined (or sewn) to the periphery of the gas inlet port 21 such that the main body 51 extends from the left side of the gas inlet port 21 whereas the rear end 51b portion of the main body 51 is joined to the front end 35a portion of the arresting recess 35, such that the recess-pulling tether 47 is deployable at a slant with respect to a front and rear direction with the rear end 51b of the main body 51 disposed farther towards the left than the front end 51a, as shown in FIG. 6. The recess-pulling tether 47 has such a length as to be capable of pulling the arresting recess 35 forward generally along a front and rear direction at airbag deployment, in other words, as to be capable of preventing the left end region 33a of the front-collision arresting plane 33 from moving rearward by pulling the arresting recess 35.

The auxiliary tether 53 joints the right end region 33b (i.e. the region apart from the arresting recess 35) of the front-collision arresting plane 33 and the front end 17a portion of the airbag 15 (principal inflatable section 17) inside the principal inflatable section 17, as shown in FIG. 6. The auxiliary tether 53 of the illustrated embodiment is composed of a base member 55 shown in FIG. 7, which is generally bilaterally symmetrical with the base member 49 for forming the recess-pulling tether 47. The base member 55 includes a band-shaped main body 57 and a joint region 56 which protrudes towards the left from the front end 57a of the main body 57. The joint region 56 is joined (or sewn) to the periphery of the gas inlet port 21 such that the main body 57 extends from the right side of the gas inlet port 21 whereas the rear end 57b portion of the main body 57 is joined to a joint tab 58 which extends from a vicinity of the border between the rear side wall 26 and the right side wall 18d (i.e. from the right end region 33b of the front-collision arresting plane 33). Thus the auxiliary tether 53 is deployable at a slant with respect to the front and rear direction such that the rear end 57b of the main body 57 is disposed farther towards the right than the front end 57a, as shown in FIG. 6. The joint tab 58 of the illustrated embodiment is composed of a tab portion 69f protruding from a right edge 69d of the rear right panel 69 and a tab portion 65d protruding from a rear edge 65c of a later-described right panel 65 for forming the right side wall 18d, as shown in FIG. 8.

As shown in FIG. 6, as viewed from above, the auxiliary tether 53 and the recess-pulling tether 47 each extend towards the left and the right from the mounting center C generally symmetrically at airbag deployment. In other words, the auxiliary tether 53 and the recess-pulling tether 47 are disposed generally bilaterally symmetrically with respect to the center line CL which runs through the mounting center C in the front and rear direction. The auxiliary tether 53 including the joint tab 58 has such a length as to be capable of preventing the right end region 33b of the front-collision arresting plane 33 from moving rearward at airbag deployment. Further, as shown in FIG. 3, the rear end 51b of the recess-pulling tether 47 and the rear end 57b of the auxiliary tether 53 are joined to a generally identical level which is slightly above the center in the up and down direction of the rear side wall 26. Thus, as viewed from the rear, the auxiliary tether 53 and the recess-pulling tether 47 are disposed generally bilaterally symmetrically as shown in FIGS. 3 and 8. That is, in the illustrated embodiment, the positions in the up and down direction (or levels) of joints of the rear ends 51b and 57b of the recess-pulling tether 47 and auxiliary tether 53 to the bag body 16 (or to the rear side wall 26 i.e. front-collision arresting plane 53) fall within an area where the rear end 43b of the rear section 43 of the front-rear tether 41 is arranged.

The bag body 16 is formed by sewing together circumferential edges of predetermined shaped base members. In the illustrated embodiment, as shown in FIGS. 7 and 8, the bag body 16 is composed of six base members; a front panel 60 deployable in the front side, a left panel 61 deployable on the left side, a right panel 65 deployable on the right side, a rear left panel 67 and a rear right panel 69 which are deployable on the rear side, and a protruding-section right panel 71 which constitutes the right side wall 29b of the protruding inflatable section 29.

The front panel 60 is formed into a generally band elongated generally along a front and rear direction and forms the upper wall 18a and lower wall 18b of the principal inflatable section 17.

The left panel 61 forms the left side wall 18c of the principal inflatable section 17 and the left side wall 29a of the protruding inflatable section 29. As shown in FIG. 8, the left panel 61 has such a contour that a generally triangular main body 62 for forming the left side wall 18c of the principal inflatable section 17 and a generally trapezoidal protruding region 63 disposed at the rear of the main body 62 for forming the left side wall 29a of the protruding inflatable section 29 are connected. The right panel 65 forms the right side wall 18d of the principal inflatable section 17, and is generally triangular in outer contour, which is generally identical to the main body 62 of the left panel 61. The right panel 65 is provided, at the rear edge 65c, with a tab portion 65d for forming the joint tab 58 for joint with the auxiliary tether 53.

The rear left panel 67 and the rear right panel 69 each form a left half region and a right half region of the rear side wall 26 of the principal inflatable section 17 as deployed. Each of the rear left panel 67 and the rear right panel 69 is formed into a band elongated generally in the up and down direction. The rear left panel 67 and the rear right panel 69 are each provided, at the right edge 67d and left edge 69c, with an extended region 67e and an extended region 69e for forming the rear section 43 of the front-rear tether 41. The rear right panel 69 is further provided, at the right edge 69d, with a tab portion 69f for forming the joint tab 58 for joint with the auxiliary tether 53. Moreover, the rear left panel 67 includes, at an upper region of the left edge 67c, a flap-like portion 68 for forming the right side wall 38 of the arresting recess 35. The flap-like portion 68 protrudes from the left edge 67c of the rear left panel 67. A tab portion 68d further protrudes from the front edge 68c of the flap-like portion 68 for joint with the rear end 51b of the recess-pulling tether 47.

The protruding-section right panel 71 forms the right side wall 29b of the protruding inflatable section 29 as deployed, and is formed into a generally trapezoid which is generally identical to the protruding region 63 of the left panel 61. A flap-like portion 72 for forming the left side wall 37 of the arresting recess 35 protrudes from the front edge 71c of the protruding-section right panel 71. Furthermore, a tab portion 72d protrudes from the front edge 72c of the flap-like portion 72 for joint with the rear end 51b of the recess-pulling tether 47.

In the illustrated embodiment, components of the bag body 16, i.e., the front panel 60, left panel 61, right panel 65, rear left panel 67, rear right panel 69, protruding-section right panel 71, base member 44 for forming the front section 42 of the front-rear tether 41, base members 83L and 83R/85L and 85R for forming the left-right tethers 82 and 84, base member 49 for forming the recess-pulling tether 47, and base member 55 for forming the auxiliary tether 53, are made of a flexible woven fabric of polyester yarn, polyamide yarn or the like.

As shown in FIGS. 3 to 8, the bag body 16 of the illustrated embodiment is formed by sewing (jointing) corresponding circumferential edges of the front panel 60, left panel 61, right panel 65, rear left panel 67, rear right panel 69 and protruding-section right panel 71 together with sewing threads. More specifically, the rear upper edge 60a of the front panel 60 is jointed with the upper edge 67a of the rear left panel 67 and the upper edge 69a of the rear right panel 69, and the rear lower edge 60b of the front panel 60 is jointed with the lower edges 67b and 69b of the rear left panel 67 and rear right panel 69. The left edge 60c of the front panel 60 is jointed with the upper edge 62a and lower edge 62b of the main body 62 of the left panel 61, and the right edge 60d of the front panel 60 is jointed with the upper edge 65a and lower edge 65b of the right panel 65. The left edge 67c of the rear left panel 67 is jointed with the rear edge 62c of the main body 62 of the left panel 61 and front edge 71c of the protruding-section right panel 71. The right edge 67d of the rear left panel 67 is jointed with the left edge 69c of the rear right panel 69. The right edge 69d of the rear right panel 69 is jointed with the rear edge 65c of the right panel 65. The upper edge 63a, lower edge 63b and rear edge 63c of the protruding region 63 of the left panel 61 are each jointed with the upper edge 71a, lower edge 71b and rear edge 71c of the protruding-section right panel 71. The upper edge 68a, lower edge 68b and front edge 68c of the flap-like portion 68 of the rear left panel 67 are each jointed with the upper edge 72a, lower edge 72b and front edge 72c of the flap-like portion 72 of the protruding-section right panel 71.

Mounting of the airbag device M on the vehicle V is now described. Firstly, the retainer 9 is housed inside the airbag 15, and the airbag 15 is folded up for storage in the case 12. Then a breakable wrapping sheet is wrapped around the airbag 15 for keeping the folded-up configuration. Then the airbag 15 is placed on the bottom wall 12a of the case 12, and the main body 8a of the inflator 8 is set in the case 12 from the lower side of the bottom wall 12a, such that the bolts 9a of the retainer 9 projecting downwardly out of the bottom wall 12a are put through the flange 8c of the inflator 8. If then the bolts 9a projecting out of the flange 8c of the inflator 8 are fastened with nuts 10, the airbag 15 and the inflator 8 are mounted on the case 12.

Thereafter, the circumferential wall 12b of the case 12 is attached to the joint wall 6c of the airbag cover 6 on the dashboard 1, which has been mounted on board as an integral part of the dashboard 1, and the unillustrated bracket of the case 12 are secured to the vehicle body structure. Thus the airbag device M is mounted on the vehicle V.

After the airbag device M of the illustrated embodiment is mounted on the vehicle V, in the event of a frontal collision, an oblique collision or an offset collision of the vehicle V, the inflator 8 discharges an inflation gas from the gas discharge ports 8b to inflate the airbag 15. Then the airbag 15 pushes and opens the doors 6a and 6b of the airbag cover 6, protrudes out of the case 12 via an opening formed by the opening of the doors 6a and 6b, and is deployed upward and rearward in such a manner as to fill up a space between the top plane 2 of the dashboard 1 and the windshield 4, as indicated by double-dotted lines in FIGS. 1 and 2 and as shown in FIG. 9.

In the airbag device M of the illustrated embodiment, the airbag 15 includes the oblique-collision arresting plane 34 that is disposed on the left side of the front-collision arresting plane 33 for protecting the head MH of a diagonally-moving passenger MP. In other words, the airbag 15 is designed to be inflated asymmetrically such that the protruding inflatable section 29, i.e. the portion with the oblique-collision arresting plane 34, protrudes rearward only on one side of the front-collision arresting plane 33. However, the airbag 15 of the illustrated embodiment includes the auxiliary tether 53 that joints the front end portion 17a of the airbag 15 and a side edge region of the front-collision arresting plane 33 (i.e. the right edge 33b region, in the illustrated embodiment) apart from the arresting recess 35, in addition to the recess-pulling tether 47 that joints the front end portion 17a of the airbag 15 and the bottom (the front end 35a) of the arresting recess 35 disposed between the front-collision arresting plane 33 and oblique-collision arresting plane 34. As shown in FIG. 9, the recess-pulling tether 47 and auxiliary tether 53 are designed to be deployed generally symmetrically with respect to the center line CL that runs in the front and rear direction through the mounting center C of the airbag 15 to the case (i.e. housing) 12. That is, the left edge 33a region and right edge 33b region of the front-collision arresting plane 33 are both joined to the front end portion 17a of the airbag 15 (or principal inflatable section 17) with the recess-pulling tether 47, via the arresting recess 35, and auxiliary tether 53. This configuration helps prevent the left edge 33a region and right edge 33b region of the front-collision arresting plane 33 (or rear side wall 26) from protruding rearward unduly at airbag deployment, thus deploying the airbag 15 in a balanced fashion in a left and right direction. Moreover, if the passenger's head MH moves forward and bumps a central portion in the left and right direction of the front-collision arresting plane 33 in the event of a frontal collision as indicated with double-dotted lines in FIG. 9, the central portion of the front-collision arresting plane 33 will be sunken forward such that the left edge 33a region and right edge 33b region are disposed rearward relatively. In such an instance, in the airbag device M of the illustrated embodiment, since the recess-pulling tether 47 and the auxiliary tether 53 joint both of the left and right edge regions of the front-collision arresting plane 33 to the front end portion 17a of the airbag 15, a generally identical tensile force will be applied to the recess-pulling tether 47 (including the arresting recess 35) and auxiliary tether 53, such that the region of the front-collision arresting plane 33 disposed between the recess-pulling tether 47 and auxiliary tether 53 will cushion the passenger's head MH smoothly in a balanced fashion.

Therefore, the airbag device M for a front passenger seat of the illustrated embodiment is capable of inflating the airbag 15 with a balance between the left and right portions and deploying the airbag 15 quickly, thus catching the head MH of the passenger MP in a balanced fashion in the event of a frontal collision of the vehicle V.

Moreover, the recess-pulling tether 47 is capable of keeping the arresting recess 35 recessed at airbag deployment and preventing the arresting recess 35 from oscillating in a front and rear direction during airbag deployment. That is, the recess-pulling tether 47 helps deploy the arresting recess 35 at a predetermined position quickly such that the arresting recess 35 can receive the passenger's head MH adequately.

Figure 10:
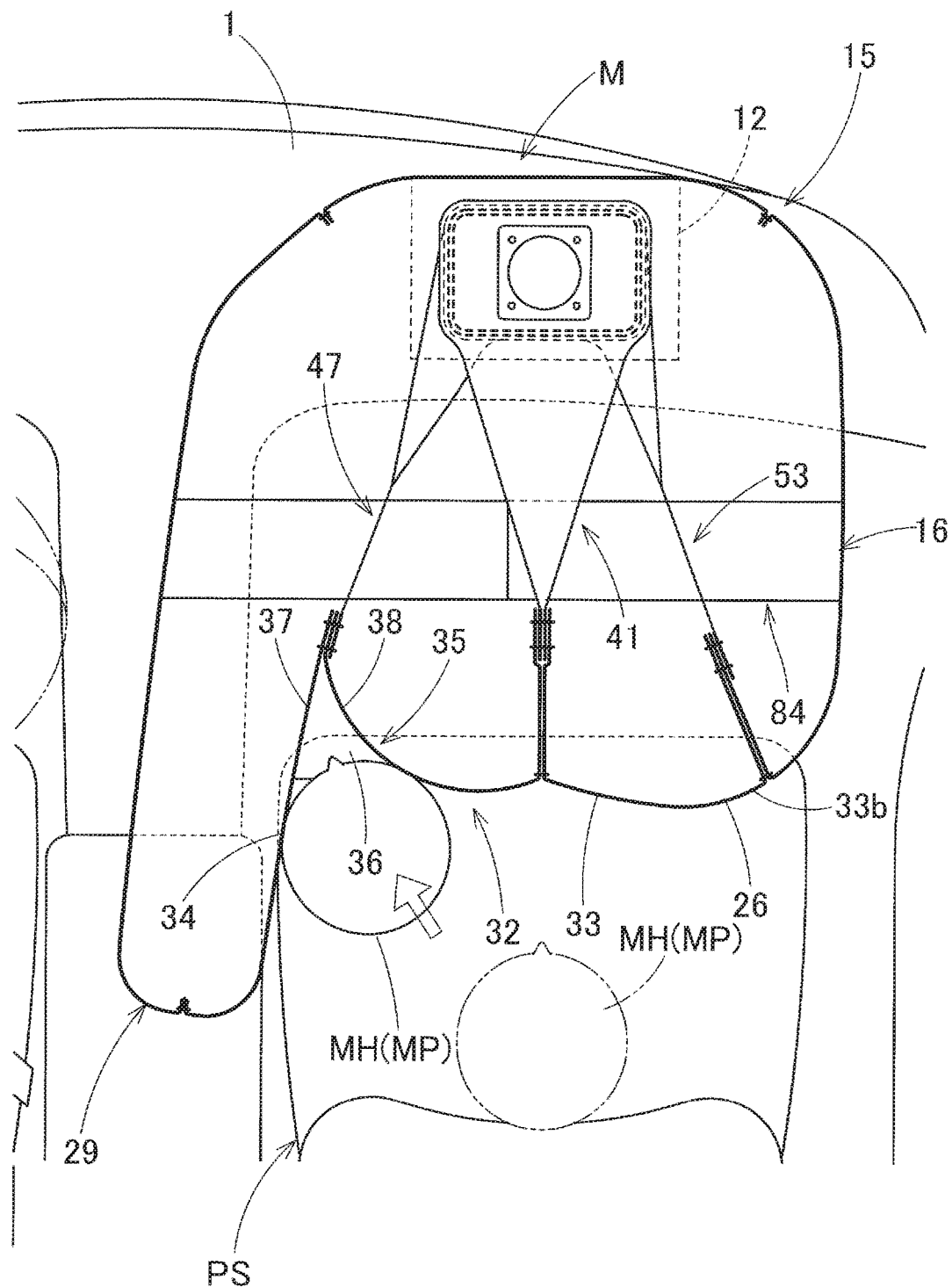
FIG. 10 is a schematic sectional view of the airbag device showing the way the airbag as deployed catches a passenger who has moved diagonally.

In the airbag device M of the illustrated embodiment, the oblique-collision arresting plane 34 is so formed as to protrude rearward from the front-collision arresting plane 34 at airbag deployment. As shown in FIG. 10, the oblique-collision arresting plane 34 configured like this is capable of catching the head MH of a diagonally-moving passenger MP and guiding the head MH into the arresting recess 35 such that the arresting recess 35 arrests the head MH further adequately in the event of an oblique collision or an offset collision of the vehicle V. If such advantageous effects do not have to be considered, the airbag may be formed without the protruding inflatable section such that the oblique-collision arresting plane would be generally flush with the front-collision arresting plane and an arresting recess would be disposed between such an oblique-collision arresting plane and the front-collision arresting plane.

Figure 16:
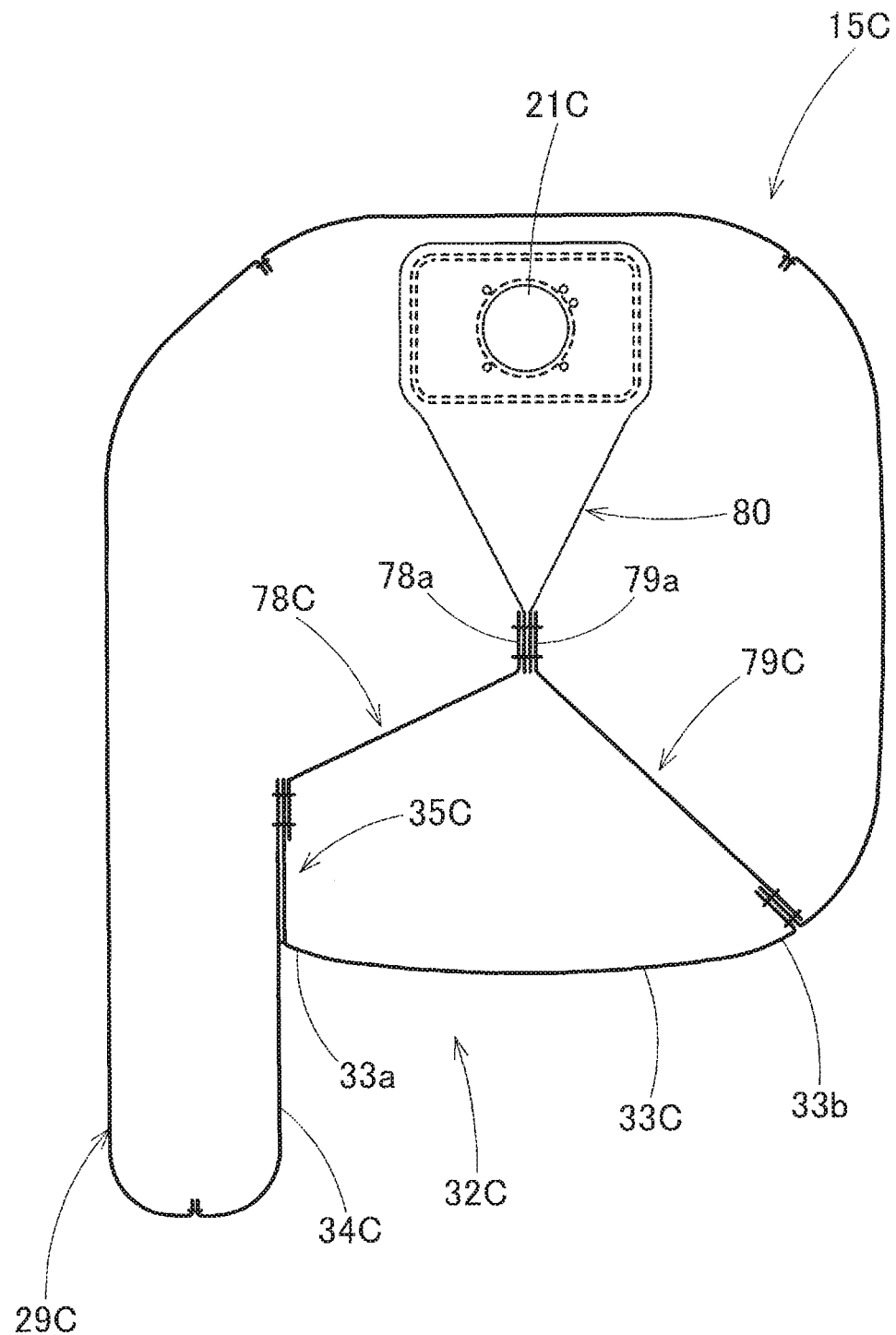
FIG. 16 is a schematic horizontal sectional view of yet another modification of the airbag of the invention as inflated by itself.

Furthermore, in the airbag device M of the illustrated embodiment, the airbag 15 further internally includes the front-rear tether 41 that joints the front end portion 17a of the airbag 15 and the generally central portion in the left and right direction of the front-collision arresting plane 33. The front-rear tether 41 is capable of preventing the front-collision arresting plane 33 from moving rearward unduly in an initial stage of airbag deployment and preventing a rearward movement of the front-collision arresting plane 33 as fully deployed as well. In the illustrated embodiment, especially, the recess-pulling tether 47 and auxiliary tether 53 are each joined to the generally central position in the up and down direction of the front-collision arresting plane 33 (or rear side wall 26) and so is the front-rear tether 41. In other words, the front-collision arresting plane 33 are pulled forward on the three same-level, leftward, central and rightward positions by the recess-pulling tether 47, front-rear tether 41 and auxiliary tether 53. This configuration is capable of steadying a deployment behavior of the front-collision arresting plane 33 (or rear side wall 26) of the airbag 15, and deploying the front-collision arresting plane 33 (or rear side wall 26) in front of the passenger quickly. If such an advantageous effect does not have to be considered, the airbag 15 may be formed without the front-rear tether like a later-described airbag 15A shown in FIGS. 11 and 12 or a later-described airbag 15C show in FIG. 16.

Figure 11:
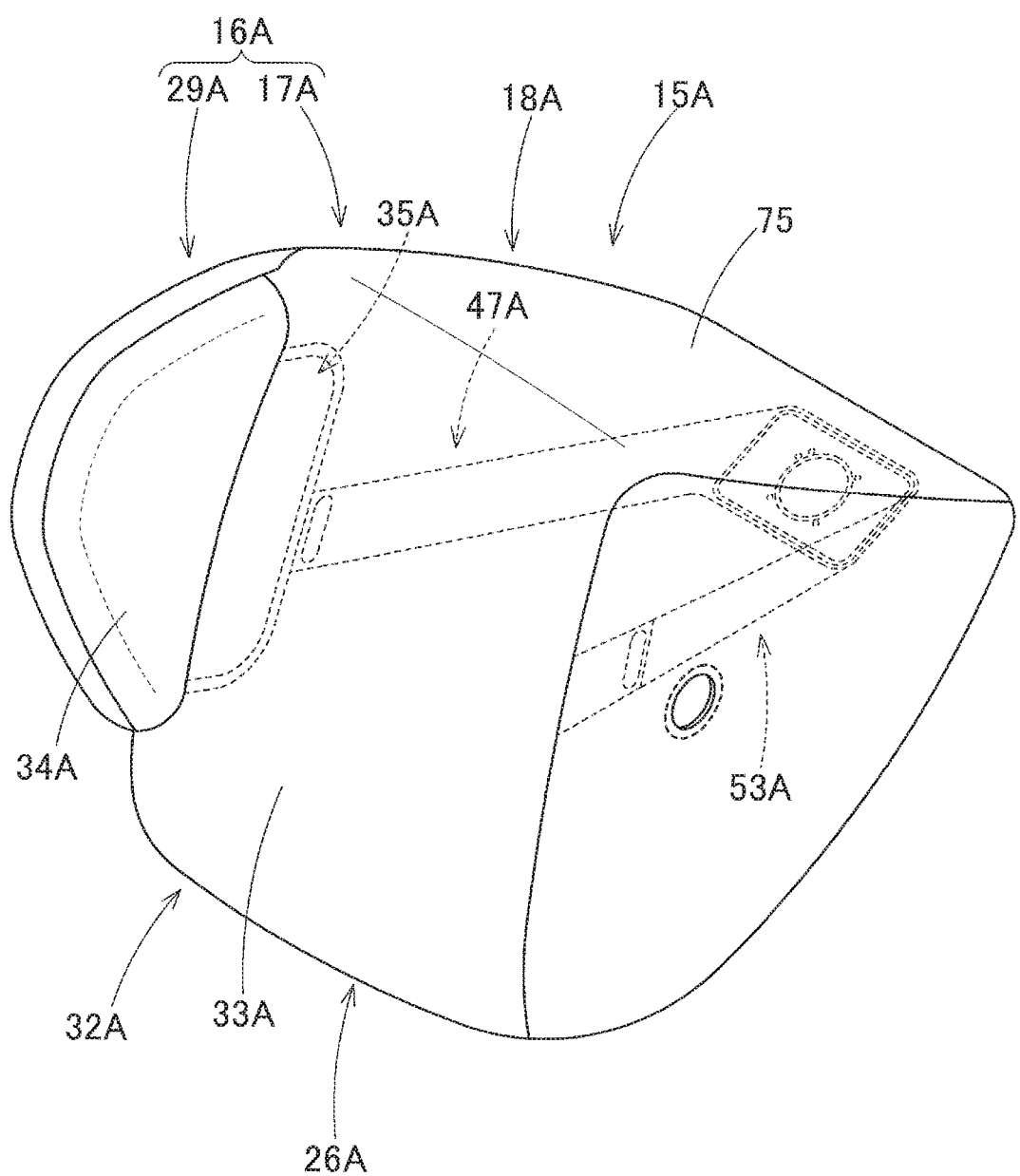
FIG. 11 is a perspective view of a modification of the airbag of the invention as inflated by itself, viewed from right rear upper direction.
Figure 12:
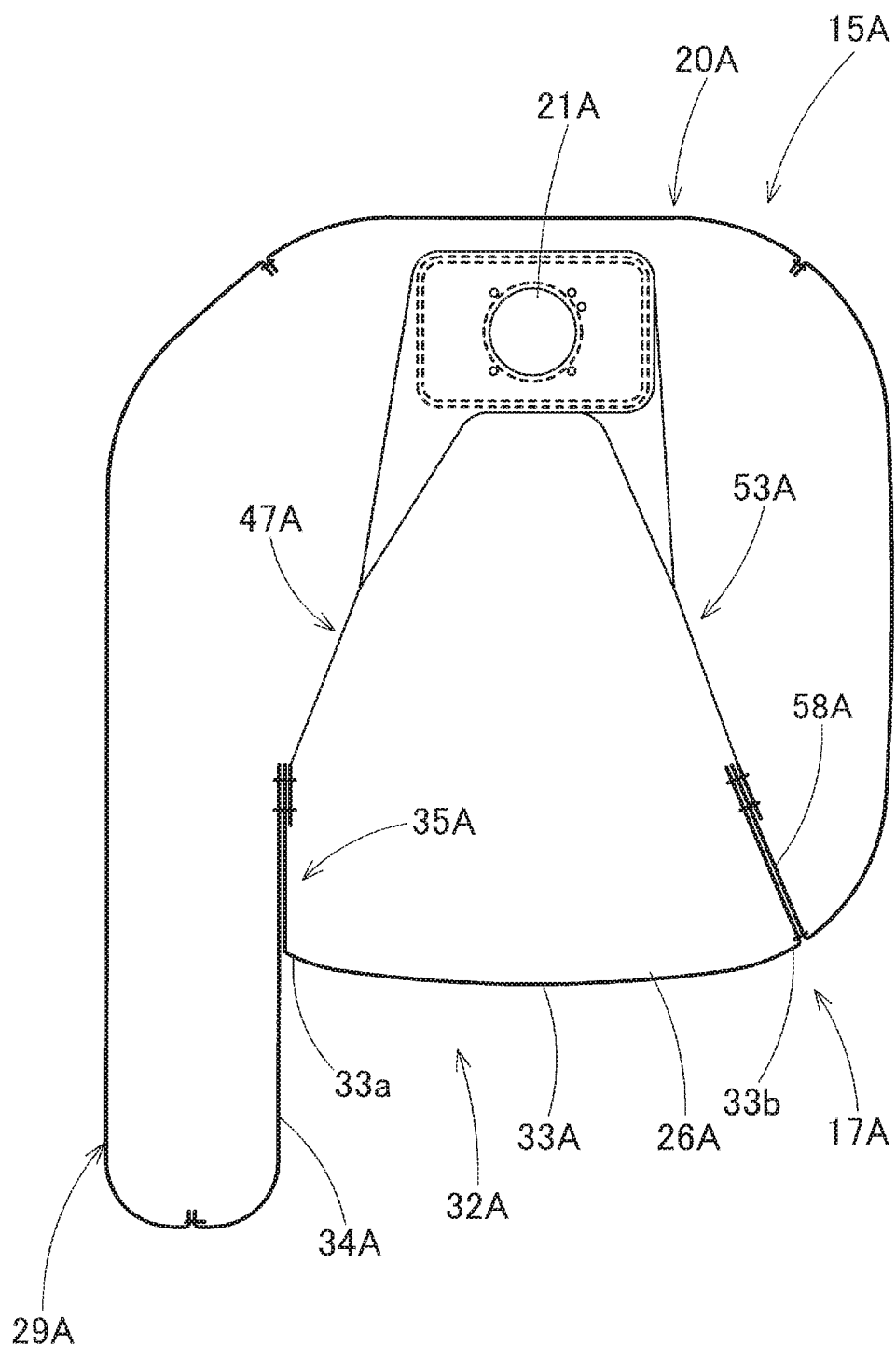
FIG. 12 is a schematic horizontal sectional view of the airbag of FIG. 11.
Figure 13:
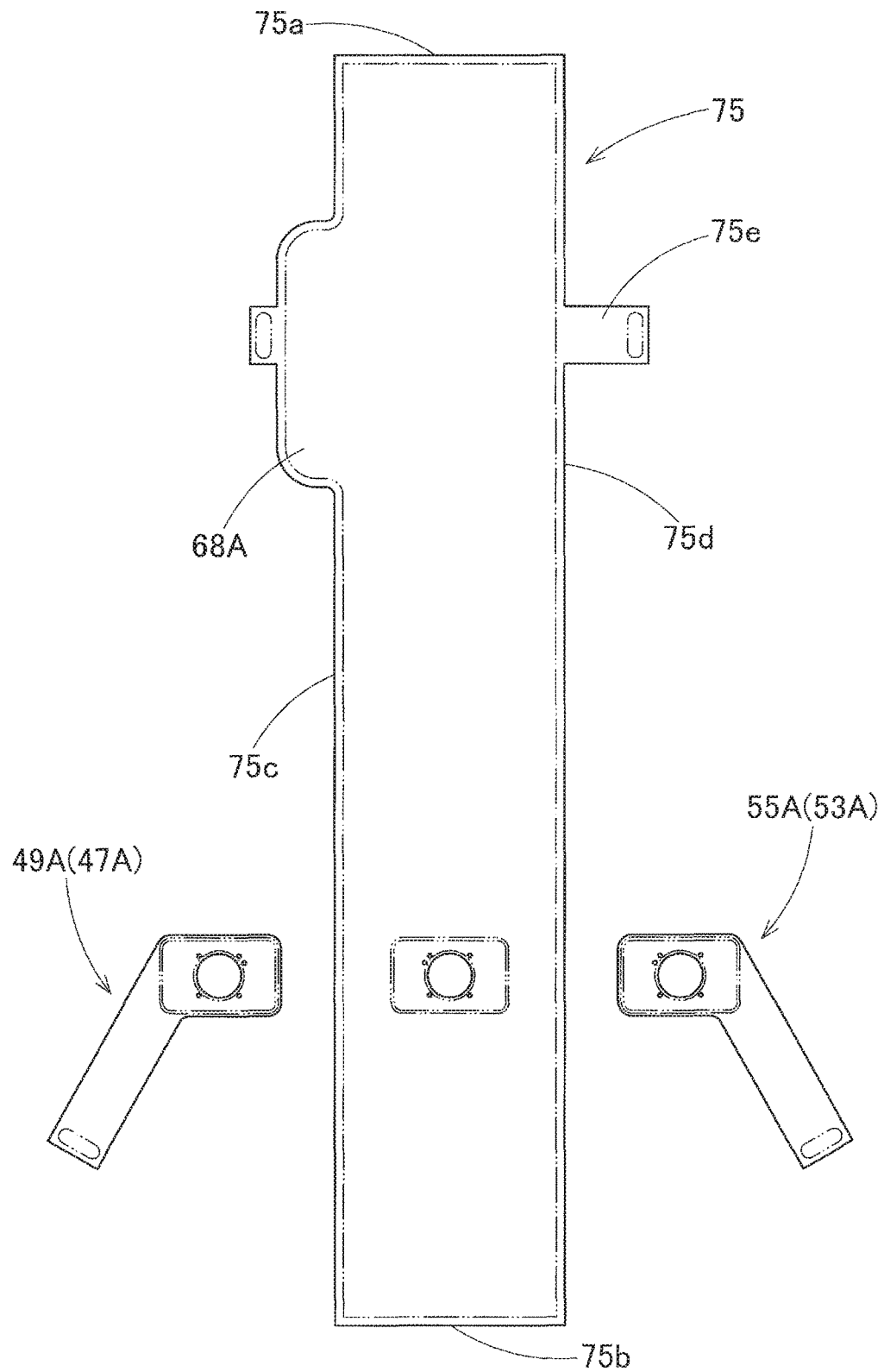
FIGS. 13 and 14 depict base members of the airbag of FIG. 11 by plan views.
Figure 14:
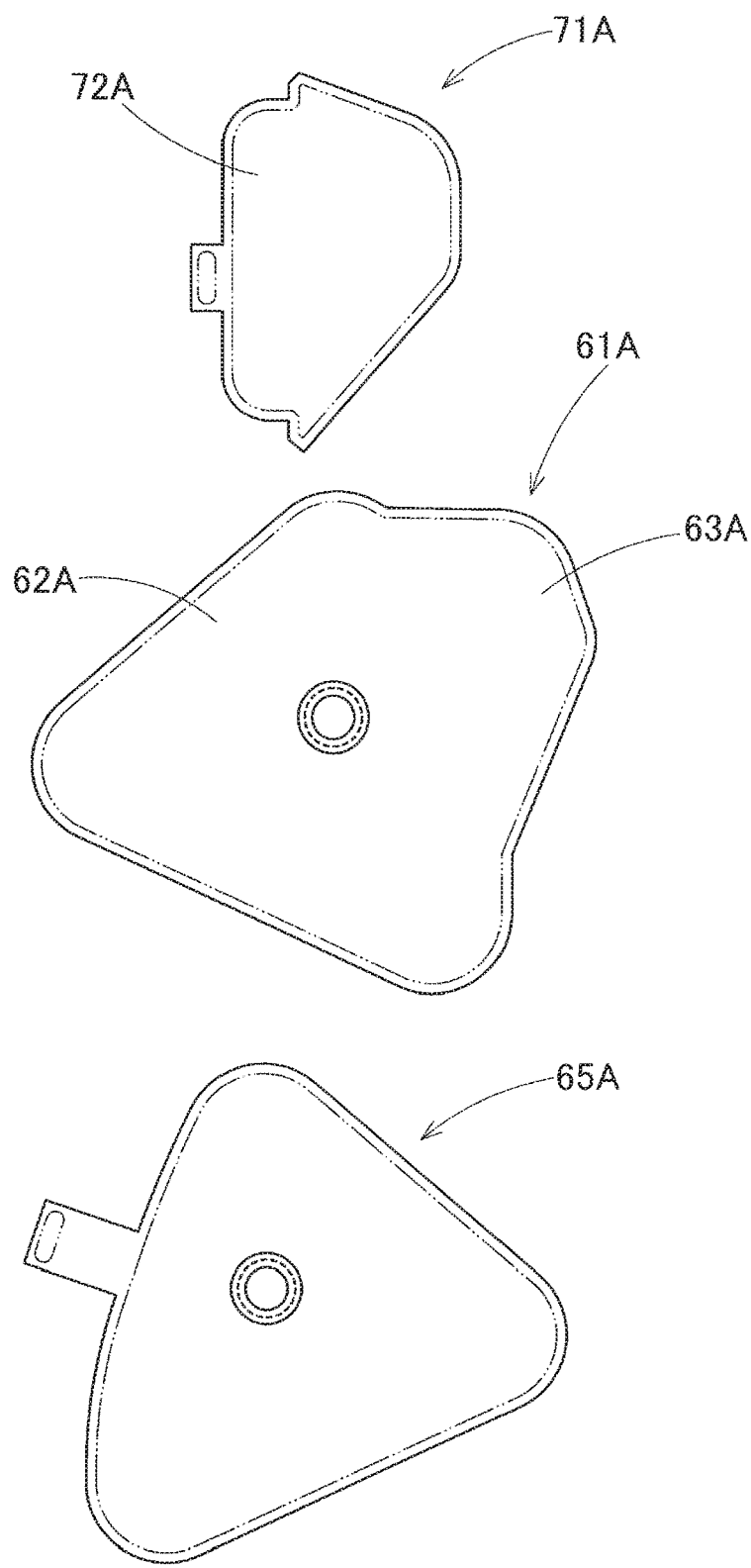

In an alternative embodiment shown in FIGS. 11 to 14, an airbag 15A has a similar configuration to the airbag 15 of the foregoing embodiment except in having no front-rear tether as shown in FIGS. 11 and 12. Therefore common members will be each given a character "A" at the end of the common reference numeral and their detailed descriptions will be omitted. As shown in FIGS. 13 and 14, the bag body 16A of the airbag 15A is composed of four base members of a main panel 75, a left panel 61A, a right panel 65A and a protruding-section right panel 71A. The main panel 75 is formed generally into a band extending generally in a front and rear direction and form an upper wall 18a, rear side wall 26A and a lower wall 18b of a principal inflatable section 17A as inflated. Although not depicted clearly, short sides 75a and 75b of the main panel 75 are joined together at a vicinity of the border between the rear side wall 26A and lower wall 18b. The main panel 75 includes, in the left edge 75c, a flap-like portion 68A for forming a right side wall 38A of the arresting recess 35A. The flap-like portion 68A protrudes from the left edge 75c of the main panel 75. A tab portion 75e is formed on the right edge 75d of the main panel 75 for forming a joint tab 58A for joint with a rear end of an auxiliary tether 53A.

Although the airbag 15A is not provided with a front-rear tether, a left edge 33a region and a right edge 33b region of the front-collision arresting plane 33A are each joined to the front end portion 17a of the airbag 15A (or principal inflatable section 17A) by a recess-pulling tether 47A including the arresting recess 35A and an auxiliary tether 53A. This configuration will also prevent the left edge 33a region and right edge 33b region of the front-collision arresting plane 33A (or rear side wall 26A) from protruding rearward unduly at airbag deployment, thus deploying the airbag 15A with a balance between left and right portions.

Figure 15:
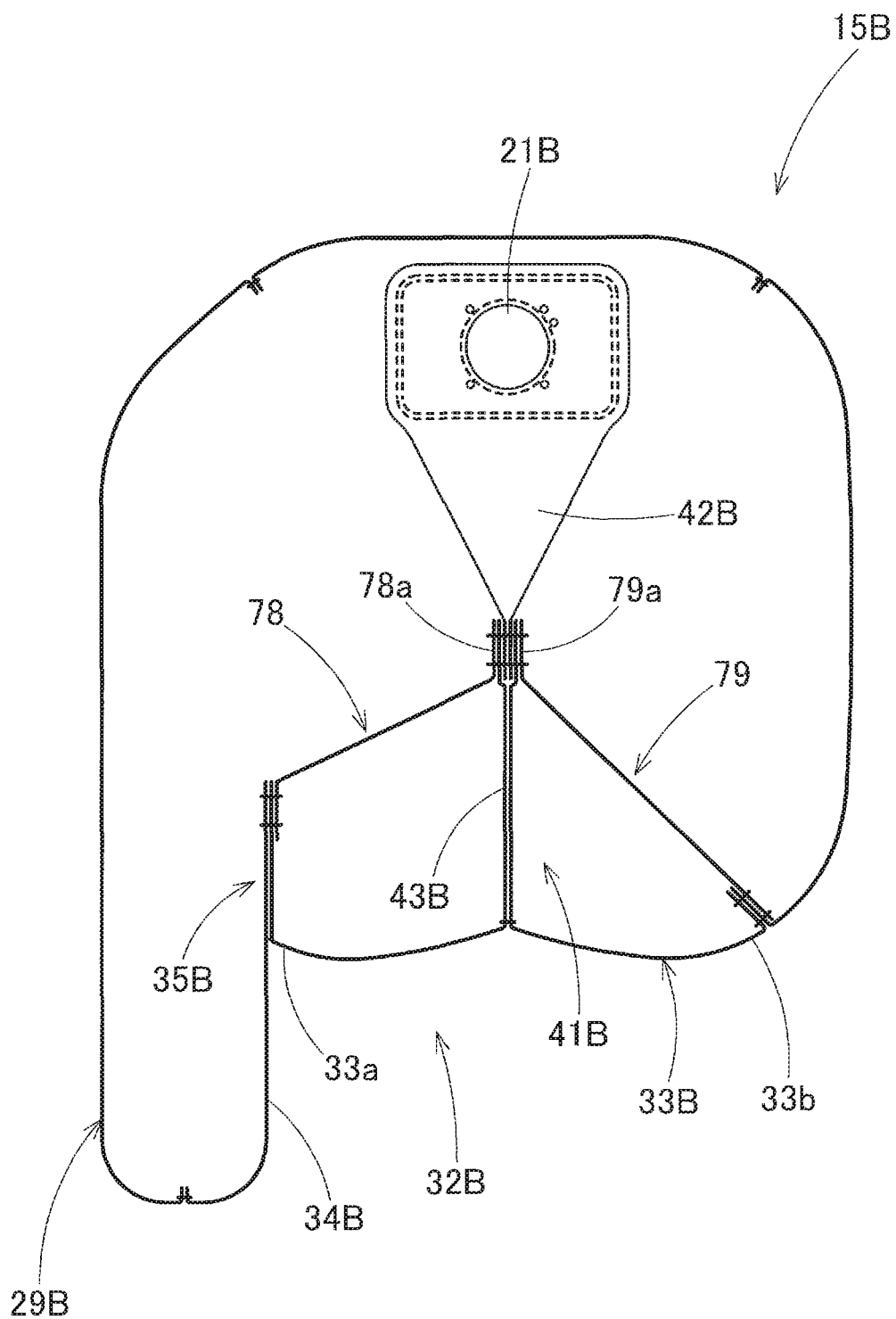
FIG. 15 is a schematic horizontal sectional view of another modification of the airbag of the invention as inflated by itself.

In the airbag 15 of the foregoing embodiment, the recess-pulling tether 47 and auxiliary tether 53 are joined to the periphery of the gas inlet port 21 by the joint regions 50 and 56. Alternatively, the airbag may be configured like an airbag 15B depicted in FIG. 15 in which a recess-pulling tether 78 and an auxiliary tether 79 are joined to the joint of a front section 42B and a rear section 43B of the front-rear tether 41B by the front ends 78a and 79a such that the recess-pulling tether 78 and auxiliary tether 79 are joined to the front end portion of the airbag 15B. That is, in the airbag 15B, the recess-pulling tether 78 and the auxiliary tether 79 are joined to the front end portion 17a of the airbag 15B at the rear of the gas inlet port 21B through the medium of the front section 42B of the front-rear tether 41B. Accordingly, the recess-pulling tether 78 and the auxiliary tether 79 are deployed symmetrically with respect to a center line CL that runs in a front and rear direction through the mounting center C of the airbag 15B. Moreover, when the front ends of the recess-pulling tether and auxiliary tether are positioned at the rear of the gas inlet port, the airbag may be configured like an airbag 15C depicted in FIG. 16. The airbag 15C does not include a front-rear tether, instead includes a connecting member 80 which extends from the periphery of the gas inlet port 21C. Front ends 78a and 79a of a recess-pulling tether 78C and an auxiliary tether 79C are joined to the rear end of the connecting member 80 in order that the recess-pulling tether 78C and the auxiliary tether 79C are joined to the front end portion of the airbag 15C. That is, in the airbag 15C, the recess-pulling tether 78C and the auxiliary tether 79C are formed to bifurcate from the connecting member 80 which extends from the front end portion of the airbag 15C.

Figure 17:
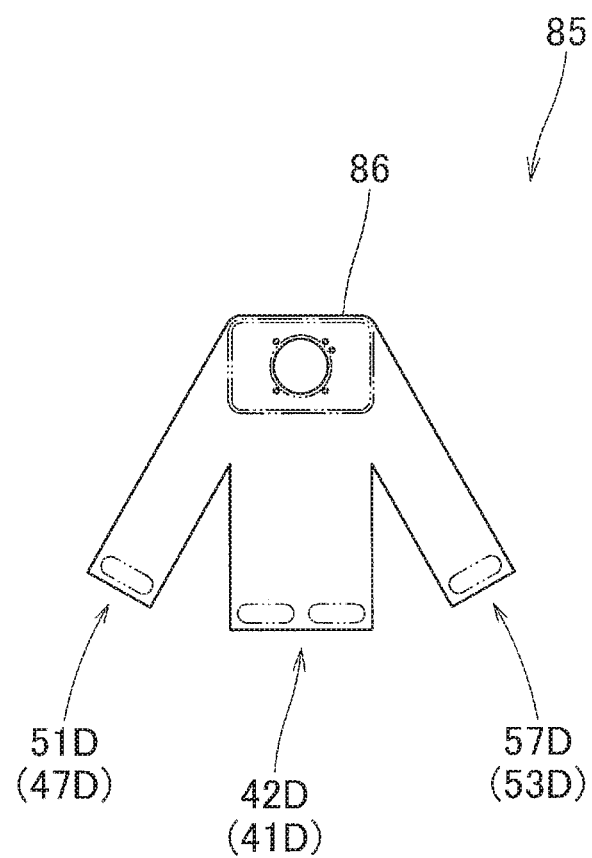
FIG. 17 is a plan view of a modification of a base member of tethers for use in the airbag of the invention.

In the airbag 15 of the foregoing embodiment, the recess-pulling tether 47, the auxiliary tether 53 and the front section 42 of the front-rear tether 41 are formed of separate base members 49, 55 and 44, and each joined to the periphery of the gas inlet port 21. However, it is also conceivable to form a front section 42D of a front-rear tether 41D, a recess-pulling tether 47D and an auxiliary tether 53D with an integral base member 85 shown in FIG. 17 such that the front section 42D of the front rear tether 41D, the recess-pulling tether 47D (main body 51D) and the auxiliary tether 53D (main body 57D) are joined to the periphery of the gas inlet port 21 with a common joint region 86.

In the airbag device M of the illustrated embodiments, the oblique-collision arresting plane 34 and the arresting recess 35 are disposed on the side of the front-collision arresting plane 33 facing towards the driver's seat DS (i.e. on the left side, or on the inboard side). This configuration will provide an adequate protection of the head MH of a front seat passenger MP when he moves diagonally forward and towards the center in a left and right direction in the event of an oblique collision or an offset collision of the vehicle V. However, if such an advantageous effects do not have to be considered, the oblique-collision arresting plane and the arresting recess may be alternatively disposed only on the right side (i.e. on the outboard side) of the front-collision arresting plane. Further alternatively, the oblique-collision arresting plane and the arresting recess may be formed on both left and right sides of the front-collision arresting plane. When the oblique-collision arresting plane and the arresting recess are formed on both left and right sides of the front-collision arresting plane, the auxiliary tether shall be joined to the bottom of the arresting recess and pull a side edge region of the front-collision arresting plane through the medium of the arresting recess.

What is claimed is:

1. An airbag device for a front passenger seat adapted to be mounted on an instrument panel in front of a front passenger seat of a vehicle, the airbag device comprising a housing that is adapted to be mounted on the instrument panel, and an inflatable airbag that is housed in the housing in a folded-up configuration and mounted on the housing by a front end portion thereof, the airbag comprising:
    a passenger protection region that is composed of a rear portion of the airbag as deployed, the passenger protection region comprising:
        a front-collision arresting plane for protecting a head of a passenger as he moves forward in the event of a frontal collision of the vehicle;
        an oblique-collision arresting plane that is disposed on a left side and/or right side of the front-collision arresting plane for protecting the head of the passenger as he moves diagonally forward in the event of an oblique collision or an offset collision of the vehicle; and
        an arresting recess that is recessed forward between the front-collision arresting plane and the oblique-collision arresting plane for catching and arresting the head of the passenger therein,
    a tether that joints the front end portion of the airbag and a bottom of the arresting recess inside the airbag and is deployable at a slant with respect to a front and rear direction; and
    an auxiliary tether that joints the front end portion of the airbag and a side edge region of the front-collision arresting plane apart from the arresting recess inside the airbag, the auxiliary tether being deployable generally symmetrically to said tether with respect to a line that runs in the front and rear direction through a mounting center of the airbag to the housing.

2. The airbag device for a front passenger seat of claim 1, wherein the oblique-collision arresting plane protrudes rearward from the front-collision arresting plane at airbag deployment.

3. The airbag device for a front passenger seat of claim 1, further comprising, inside of the airbag, a front-rear tether that joints the front end portion of the airbag and a generally central portion in a left and right direction of the front-collision arresting plane for preventing the front-collision arresting plane from moving rearward at airbag deployment, and is deployable generally along the front and rear direction.

4. The airbag device for a front passenger seat of claim 3, wherein:
    the front-rear tether is formed by joining together a front section that extends from the front end portion of the airbag and a rear section that extends from the front-collision arresting plane; and
    said tether and the auxiliary tether are joined to a joint of the front section and rear section by front ends of said tether and the auxiliary tether in order to be jointed to the front end portion of the airbag through the medium of the front section.

5. The airbag device for a front passenger seat of claim 1, wherein said tether and the auxiliary tether are formed to bifurcate from a connecting member that extends from the front end portion of the airbag.

* * * * *